United States Patent [19]
Ogata et al.

[11] Patent Number: 5,495,096
[45] Date of Patent: Feb. 27, 1996

[54] MULTI-FOCUS OPTICAL DEVICE

[75] Inventors: Shiro Ogata, Kyoto; Hiroshi Goto, Yamatokoriyama; Yoshinori Ito, Takatsuki; Koichi Imanaka, Kyoto, all of Japan

[73] Assignee: Omron Corporation, Kyoto, Japan

[21] Appl. No.: 948,279

[22] Filed: Sep. 21, 1992

[30] Foreign Application Priority Data

| Sep. 20, 1991 | [JP] | Japan | 3-270358 |
| Sep. 30, 1991 | [JP] | Japan | 3-280613 |
| Apr. 22, 1992 | [JP] | Japan | 4-130015 |

[51] Int. Cl.$^6$ ........................ G06K 7/10
[52] U.S. Cl. ........................ 235/462
[58] Field of Search ........................ 235/472, 454, 235/462, 455; 359/205, 565, 566

[56] References Cited

U.S. PATENT DOCUMENTS

| 4,733,943 | 3/1988 | Suzuki et al. | 359/565 |
| 4,818,847 | 4/1989 | Hara et al. | 235/455 |
| 5,019,698 | 5/1991 | Eastman | 235/462 |
| 5,187,353 | 2/1993 | Metlitski et al. | 235/462 |
| 5,212,501 | 5/1993 | Nakamura et al. | 346/108 |

FOREIGN PATENT DOCUMENTS

| 0152733 | 8/1985 | European Pat. Off. . | |
| 0175358 | 3/1986 | European Pat. Off. . | |
| 0249713 | 12/1987 | European Pat. Off. . | |
| 488177 | 6/1992 | European Pat. Off. | 235/465 |
| 59-33576 | 2/1984 | Japan | 235/462 |
| 1121986 | 5/1989 | Japan | 235/455 |
| 2244388 | 9/1990 | Japan | 235/455 |
| 214279 | 9/1991 | Japan | 235/462 |
| 3233692 | 10/1991 | Japan | 235/462 |

OTHER PUBLICATIONS

IBM Technical Disclosure Bulletin, vol. 15 No. 1 Jun. 1972.

*Primary Examiner*—John Shepperd
*Attorney, Agent, or Firm*—Foley & Lardner

[57] ABSTRACT

A multi-focus optical sensing device for use in bar code scanners, photoelectric sensors and the like is disclosed. To extend the range of detection along the optical axis, without increasing the detection time, the focal point of the light beam is caused to move along the optical axis. A control and modulation circuit varies a current $I_f$ which drives an optical semiconductor serving as a light source. This changes the focal distance of a refraction lattice and so causes the focal position of the light beam emitted by light source to scan along the optical axis. This scan is repeated each time a polygonal mirror scans the light beam over the narrowest width 1/n (where n is an integer) of the bar code lines. A processing unit samples and processes the signal from a photodetector unit while the light beam is being scanned along the optical axis.

40 Claims, 25 Drawing Sheets

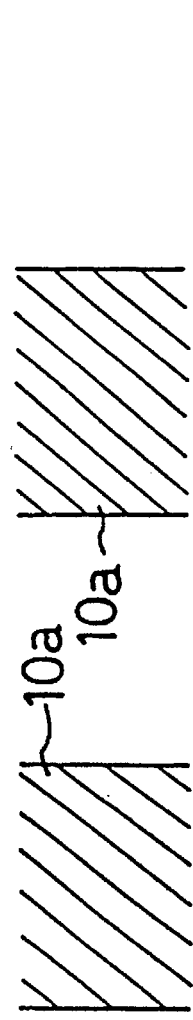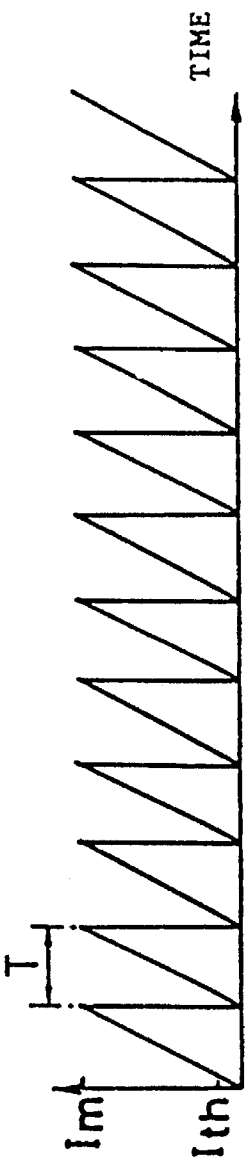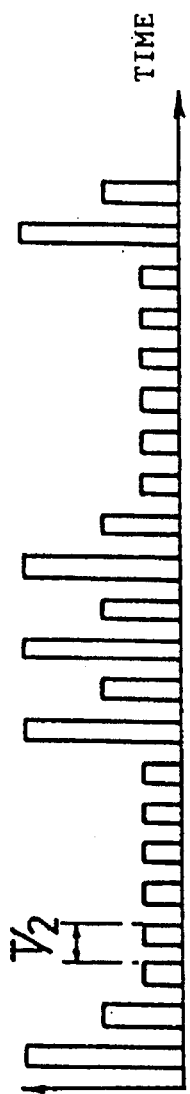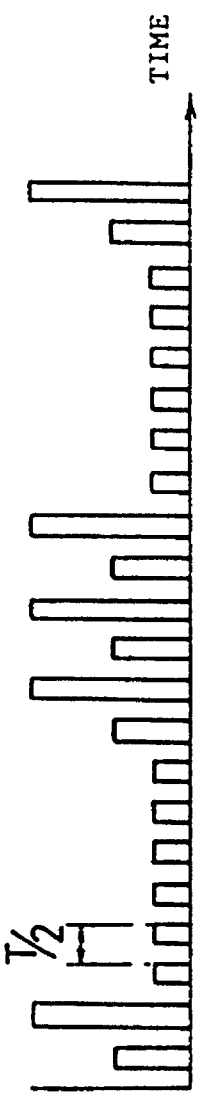
FIG. 22(a) DRIVE CURRENT $I_f$
FIG. 22(b) DRIVE PULSE FOR OPTICAL SEMICONDUCTOR
FIG. 22(c) SIGNAL RECEIVED WHEN OBJECT IS FAR AWAY
FIG. 22(d) SIGNAL RECEIVED WHEN OBJECT IS CLOSE

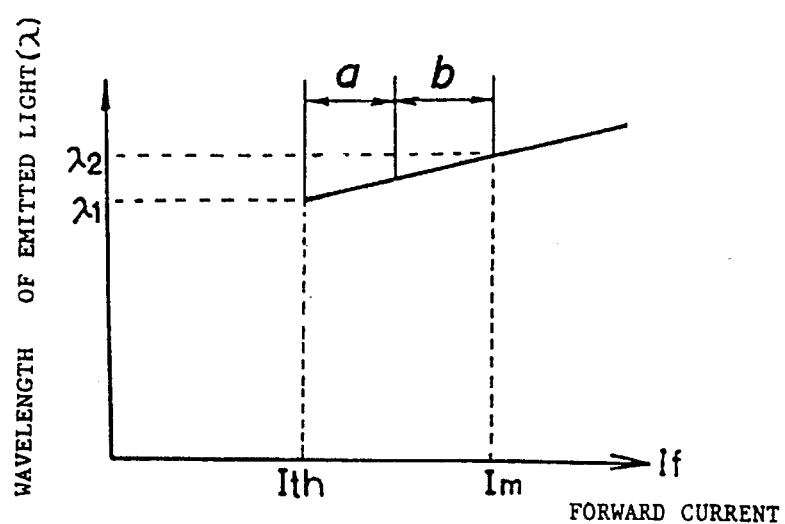
FIG. 25
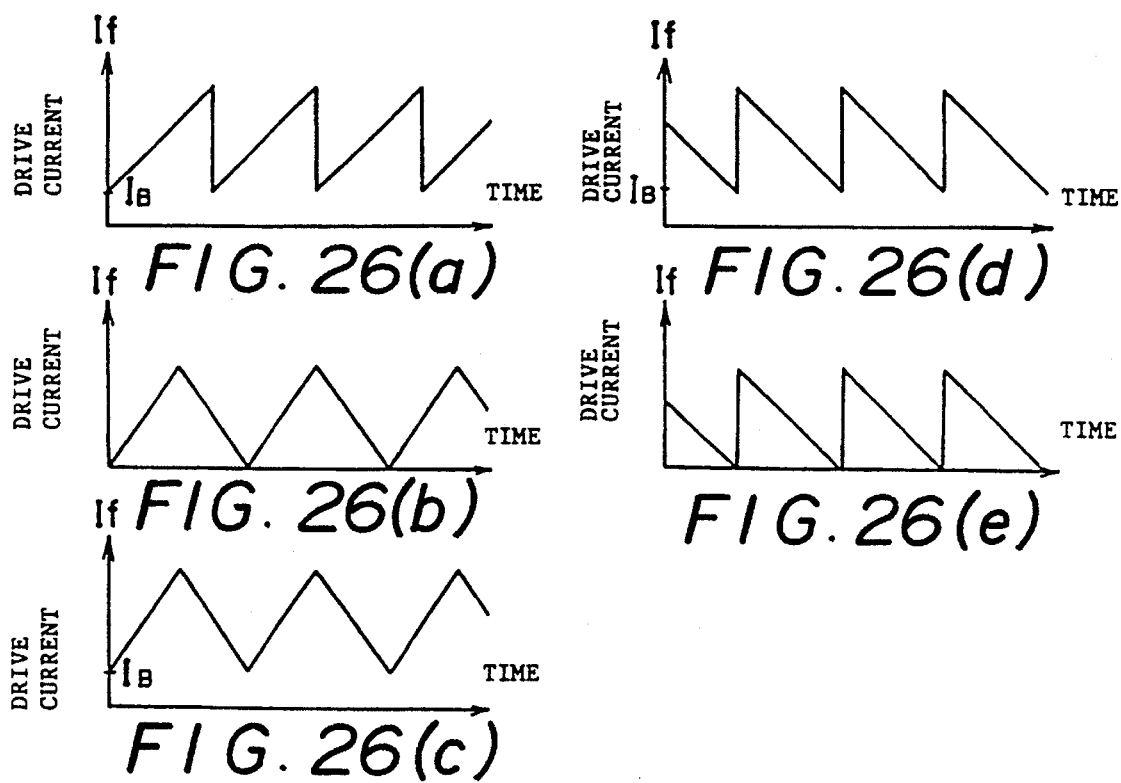
FIG. 26(a)
FIG. 26(b)
FIG. 26(c)
FIG. 26(d)
FIG. 26(e)

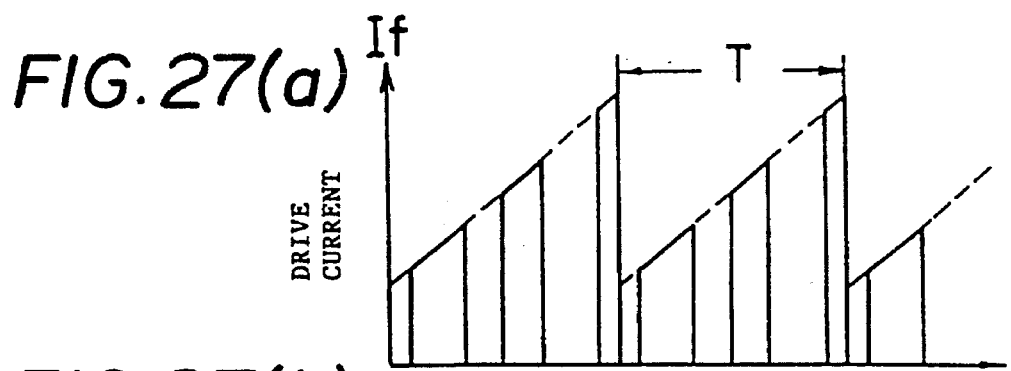
FIG. 27(a)
FIG. 27(b)
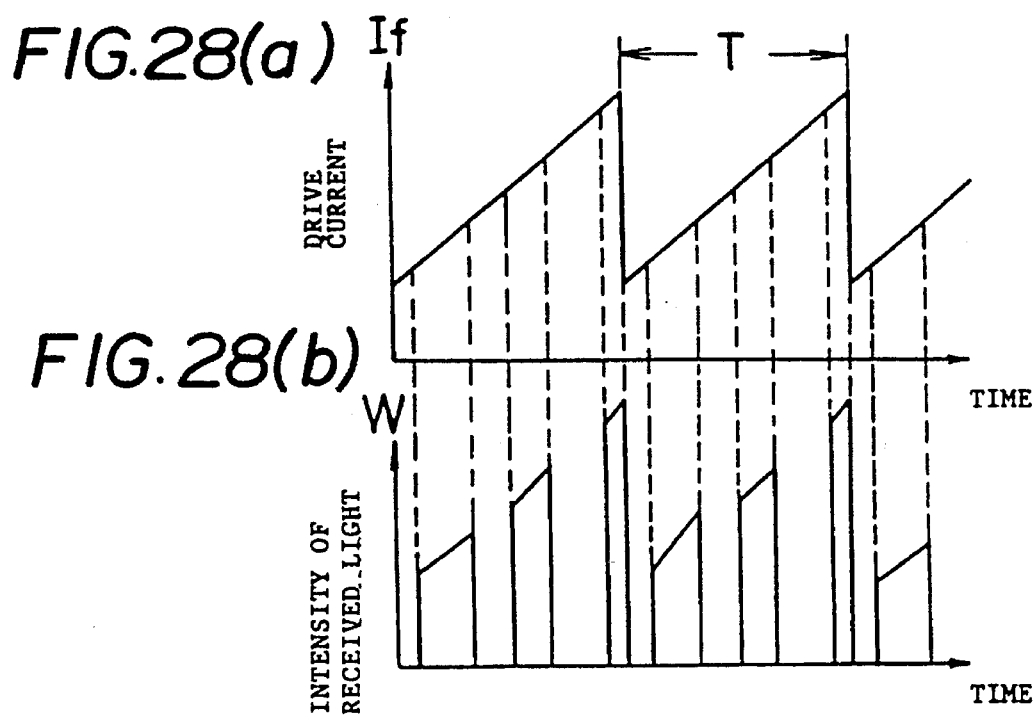
FIG. 28(a)
FIG. 28(b)

FIG. 31(a)
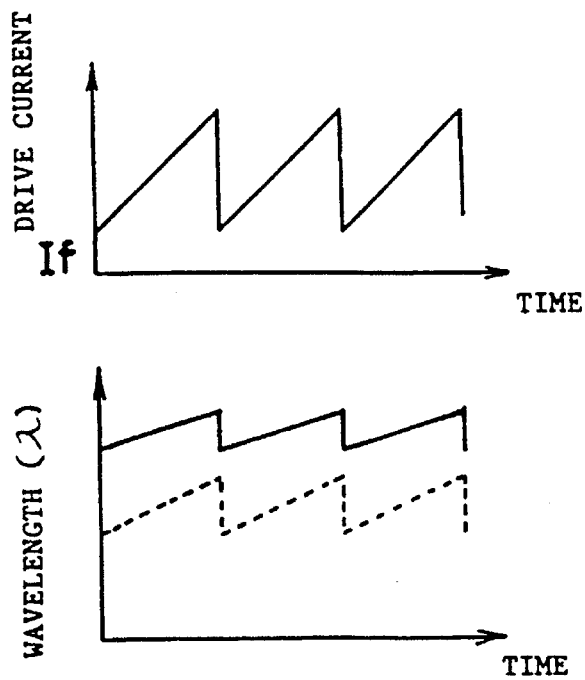
FIG. 31(b)
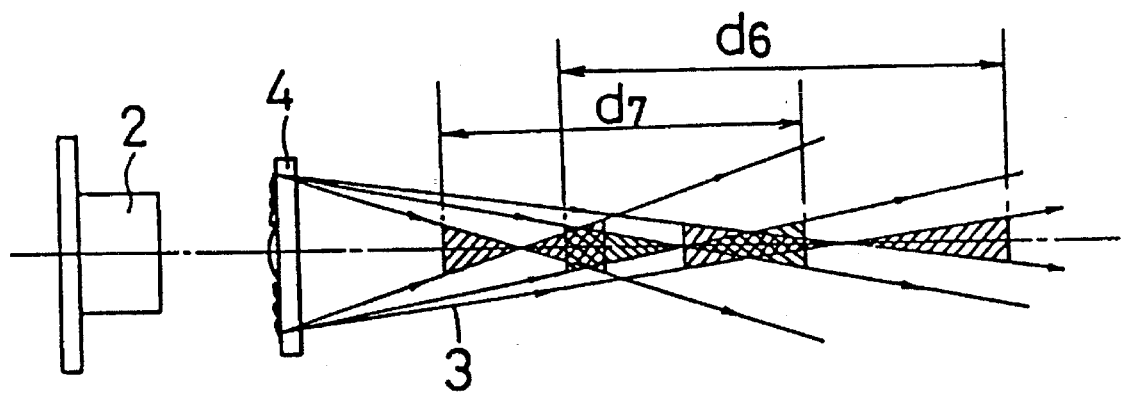
FIG. 32

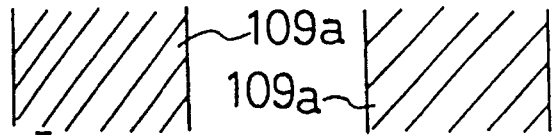
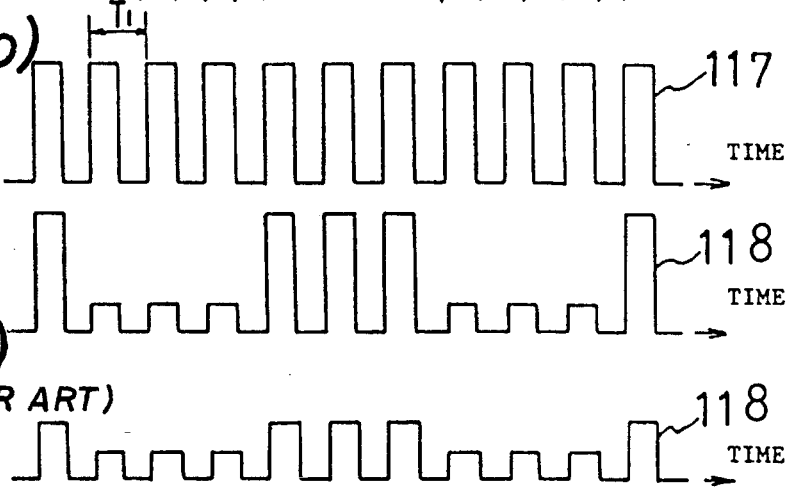
FIG. 35(d)
(PRIOR ART)
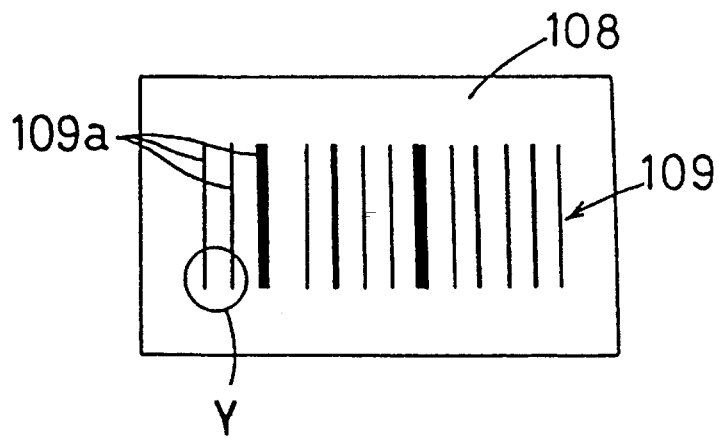
FIG. 36
(PRIOR ART)

MULTI-FOCUS OPTICAL DEVICE

FIELD OF THE INVENTION

This invention relates to a multi-focus optical device which is used for scanners in bar code readers, and for photoelectric sensors and the like. More specifically, this invention provides a multi-focus function which allows adjustment of the focal distance of a diffractive condenser lens, either automatically or manually, in order to enlarge the focal range. If used for a scanner in a bar code reader, the bar codes in a wide range can be read at a high rate and more accurately, and if used for photoelectric sensors, the range of detection can be increased along the line of the optical axis.

BACKGROUND OF THE INVENTION

FIG. 33 shows an example of a related art bar code reader and the principle by which it operates. The optical scanner 102 of bar code reader 101 consists of laser light source 103, which is a semiconductor laser element, to emit laser beam 104a or the like; refractive condenser 105 to produce constricted laser beam 104b, scanning unit 106 to scan constricted laser beam 104c on bar code label 108.

When aimed at bar code label 108 on goods 107, laser beam 104c is absorbed by the black bars in bar code 109 and reflected by the white spaces. Optical reader unit 117 converts reflected laser beam 104d, which strikes photodetector unit 110, into an analog signal 111 which corresponds to the pattern of bar code 109. This signal is amplified by video amplifier 112. Amplified signal 113 is converted to digital signal 115 by A/D converter 114, decoded by decoder 116, and output.

It is well known that the width of a narrow bar on the bar code label must be matched with the resolution capability of the reader to optimize the rate at which bar codes can be read by a bar code reader. If the resolution capability is lower than the width of a bar, the reading rate will naturally decrease; on the contrary, if the resolution capability is excessive with respect to the width of the bars, the reading rate will likewise decrease. This is because a reader with too high a resolution capability will detect irregularities such as rough edges on the bars, voids (holes within the bars) and spots in the spaces between the bars.

However, the resolution capability of a bar code reader depends on the diameter of the beam, which in turn depends on the distance from the bar code reader 101 to the object which is to be read (the reading distance). Thus, the reading rate for bar codes is limited on its upper end. Let us use the example of the optical device in optical scanner 102, pictured in FIG. 34. In this device, the region which contains the focal point F will have high resolution; the region adjacent to focal point F will have medium resolution; and the region furthest away will have low resolution. If the width of bar code is very thin or if the bar code on goods is positioned at a long reading distance, the range in which the code can be read will be extremely short. This is why existing bar code readers require that the position of the bar code label be moved into the high resolution region, and the operator is required to search for that region by moving the goods around.

Another existing bar code reader applies a pulse drive to a laser light source over a drive time $T_1$, so as to divide the bar code lines into numerous segments. By accepting reflected signals over a corresponding period of time, a bar code reader can read a code with accuracy. For example, FIG. 35(a) shows an enlarged segment (Segment Y) of bar code label 108 shown in FIG. 36. The segment contains two lines 109a. As shown in FIG. 35(b), the drive circuit for the laser light source outputs pulsed drive current 117 with a period $T_1$, which corresponds to the narrower width of lines 109a. The pulse drive causes the laser light source to emit light. The processing unit which receives the optical signal accepts signal 118 from a photodetector unit for a period $T_1$ corresponding to a single pulse of drive current 117. To prevent reading errors, each time it reads a label the reader scans a laser beam a number of times, so the reliability of signal detection is quite high.

When the object to be detected (the bar code label) is in the position where the light from the optical scanner can be focused (high resolution area), the light will be absorbed by lines 119a and reflected by the white spaces. A reflected signal 118 with a proper S/N ratio, as shown in FIG. 35(c), will be obtained. If, on the other hand, the object is far from the proper location or close to it but not in it (e.g., in the low resolution area), the diameter of the light beam will increase, and reflected signal 118 will have a low S/N ratio, as shown in FIG. 35(d). Thus, this type of bar code reader also requires that label 108 be moved to the high resolution area, so the operator must search for that area by moving the goods around.

These same kind of reading problems may occur photoelectric sensors as long as the sensor elements are positioned in a low resolution area.

SUMMARY OF THE INVENTION

In view of the shortcomings of existing optical devices described above, the object of this invention is to enlarge the range in which an object can be detected by an optical reader unit by causing the light beam emitted by an optical semiconductor light source to change its focal point or to scan a wide range without requiring that the light source itself move.

To achieve above object, the optical device of this invention includes an optical semiconductor light source and a diffractive condenser to focus on the desired object the light emitted by the aforesaid light source. One distinguishing feature is that the aforesaid diffractive condenser includes an unevenly spaced diffraction lattice having the property of a lens, and the aforesaid optical semiconductor light source is controlled by a drive circuit which varies input current of the light source to vary focal distance.

It is well known that an unevenly spaced diffraction lattice, such as a Fresnel lens, changes the focal distance according to changes in the wavelength of the light it receives. If an unequally spaced diffraction lattice is used as the diffractive condenser, we can adjust the distance at which the lens will focus and the position of the focal point by varying the wavelength of the light emitted by the optical semiconductor serving as the light source. In this way we can adjust and control the focal position of the optical device.

When such an optical device with a scanning function is used in a bar code reader device, the light beam can be scanned while its focal position is being changed. The region where bar codes can be read at a high rate can be expanded, and the codes can be read accurately without requiring the operator to move the goods or product on which the bar code label is affixed. Thus, this invention relates to an optical device with a multi-focus function to adjust the focal distance.

It is also well known that the wavelength of the light emitted by light source, such as a semiconductor laser element or LED, varies according to the output light value of that light source. The output light value can be controlled by varying the input current of the light source. Therefore, if we vary the input current for the light source, the wavelength can be varied too. In this invention, we vary the input current for a light source in periods which are as long as, or longer than, the scanning period, so that photoelectric signals with proper S/N ratio can be obtained.

It is also possible for this device to be equipped with a switch to set the desired level for the input current to vary the wavelength. Another way to vary the wavelength is to provide a control circuit which can control the input current for the light source continuously or discontinuously, and cause the light source to vary in periods which are as long as or longer than the scanning period of the scanner.

It is further possible that the device may have a drive circuit which can provide a bias on the current which drives the optical semiconductor serving as the light source. This bias may be such that the current repeatedly enters the on and off states in a periodic fashion. The drive circuit could also vary the duty factor of the bias drive.

It is further possible for the above current to be a triangular wave, to vary the focal points continuously.

If a drive circuit is provided which can vary the intensity of the light emitted by the optical semiconductor serving as a light source, the device may have a photodetector unit as a feedback function which receives a portion of the light emitted by the optical semiconductor. The intensity of the light emitted by the light source can be controlled based on the quantity of light received by this photodetector unit.

Moreover, the focal position can be changed automatically by controlling the intensity of the light emitted by the optical semiconductor via the drive circuit, or it may be changed as desired by a manual means such as a switch.

Thus, the focal position is changed electrically and optically, so it can be changed more quickly than when the optical semiconductor light source is moved mechanically. This embodiment is also simpler and more reliable than those involving mechanical movement.

If this device is employed in a bar code reader, we can cause the light beam to scan while varying the location upon which it is focused. We can thus enlarge the region within which the bar code can be read at a high rate. Bar codes can be read with great accuracy without requiring the operator to move the product on which the bar code label is affixed. If this device is employed in a photoelectric sensor, the range of detection can be increased along the line of the optical axis.

Because the drive unit for the optical semiconductor controls the focal point, it is possible to read and detect bar codes even when environmental vagaries such as temperature or humidity cause the focal point to vary. In other words, the device's resistance to the environment is excellent.

The focal position is changed by changing the drive current for the optical semiconductor light source in periods corresponding to the shortest detection time. Thus, even if detection is being performed while progressively moving the detection position, it is possible to increase the range of detection without increasing the reading or detection time. And the reading or detection time does not increase even when the label is read repeatedly to prevent errors in reading or detection.

BRIEF DESCRIPTION OF THE DRAWINGS

FIGS. 22(a)–22(d) show an embodiment by which the drive current supplied by the drive unit for the optical semiconductor is controlled wherein FIG. 22(a) is an enlargement of the portion marked "X" in the bar code label in FIG. 23;

FIG. 22(b) shows what happens when the current which drives the optical semiconductor used as a light source interacts with the bar code lines in FIG. 22(a);

FIG. 22(c) shows the appearance of the photodetection signal when the object to be detected (that is, the bar code label) is properly positioned;

FIG. 22(d) shows the appearance of the signal when the object is improperly positioned;

FIG. 25 shows the relationship between the wavelength of the light emitted by a semiconductor laser element and the forward current;

FIGS. 26(a), 26(b), 26(c), 26(d) and 26(e) show the various waveforms of drive current used for other embodiments;

FIGS. 27(a) and 27(b) show another embodiment in which this invention can be implemented wherein FIG. 27(a) shows how the drive current is varied, and FIG. 27(b) shows the effective light output of the optical semiconductor laser which serves as the light source;

FIGS. 28(a) and 28(b) show yet another embodiment in which this invention can be implemented wherein FIG. 28(a) shows how the drive current is varied, and FIG. 28(b) shows the signal received by the processing unit;

FIGS. 31(a) and 31(b) show another example of how this invention can be implemented, wherein FIG. 31(a) shows how the drive current is varied, and FIG. 31(b) shows how the wavelength of the light beam emitted by the optical semiconductor light source varies over time;

FIG. 32 illustrates the operation of the embodiment discussed above;

FIGS. 35(a)–35(d) illustrate the principle by which another existing bar code reader operates, wherein FIG. 35(a) is an enlargement of the segment marked "Y" in the bar code label pictured in FIG. 36;

FIG. 35(b) shows how the drive current of the laser light source corresponds to the bar code line shown in FIG. 35(a);

FIG. 36(c) shows the appearance of the signal when the object (that is, the bar code label) is properly positioned;

FIG. 35(d) shows the appearance of the signal when the object is improperly positioned;

FIG. 36 is a simplified drawing of a bar code label; and

DETAILED DESCRIPTION OF THE PREFERRED EMBODIMENTS

Figure 1:
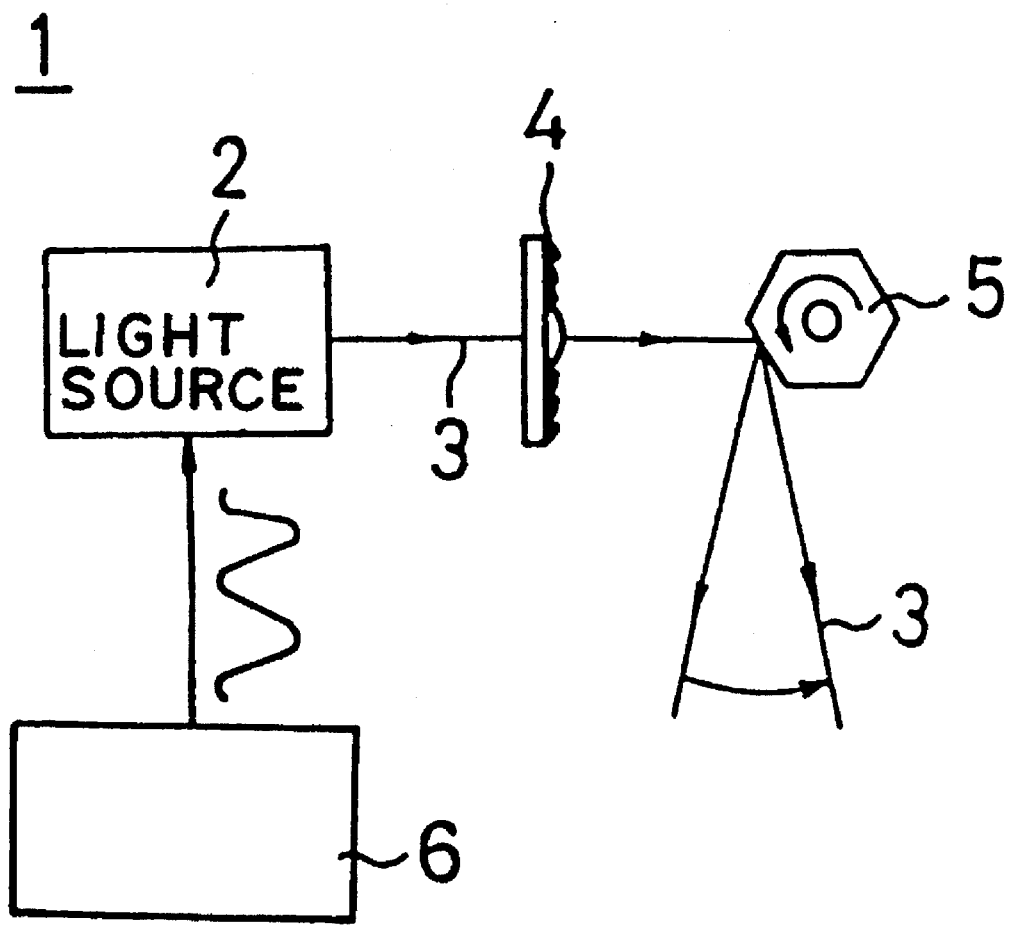
FIG. 1 is a structural diagram of an optical scanner in which this invention has been implemented.
Figure 33:
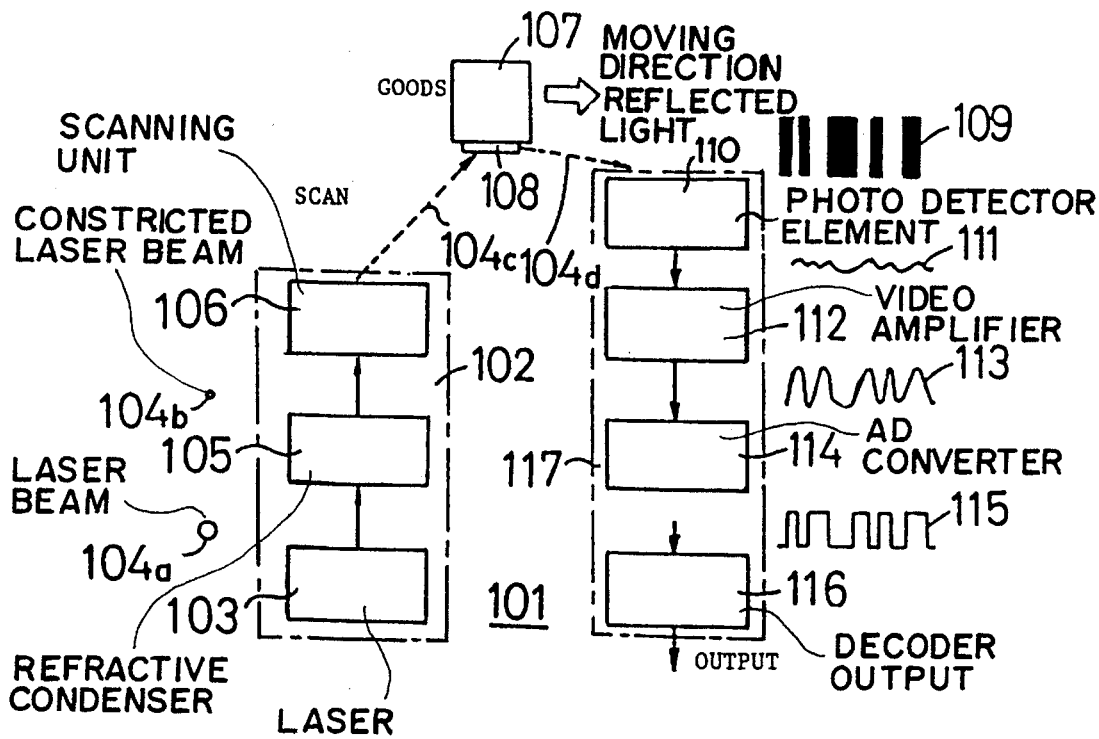
FIG. 33 shows the structure of a related art bar code reader and the principle by which it reads bar codes.
Figure 34:
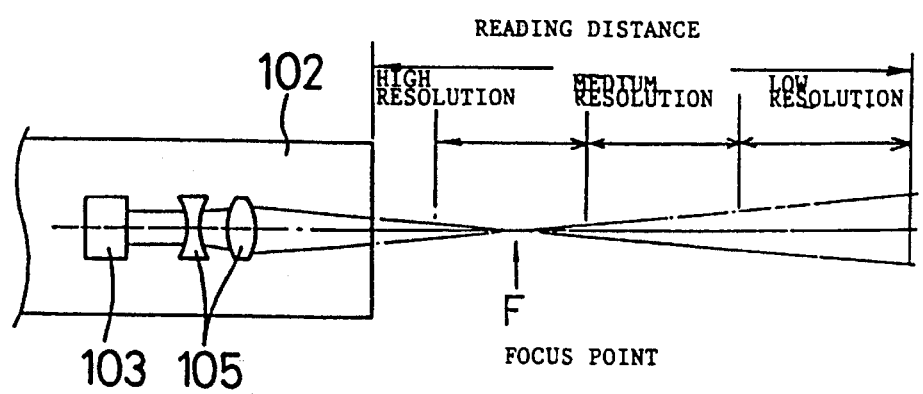
FIG. 34 shows the relationship between the opticell scanner and the resolution of a bar code reader.

FIG. 1 is a simple diagram of the structure of optical scanner 1, in which this invention can be implemented. Optical scanner 1 could, for example, be used in the bar code reader structure illustrated in FIG. 33. The scanner includes optical semiconductor light source 2, which may be a semiconductor laser element or an LED; diffraction-type condenser (diffraction lattice) 4, such as a micro-Fresnel lens, which focuses light beam 3 emitted by light source 2; polygonal mirror (deflector) 5, which deflects light beam 3 after it is focused and causes it to scan; and control and modulation circuit 6 (the circuit which drives the opticell semiconductor), which controls the current that drives optical semiconductor light source 2.

Light beam 3, which is emitted by light source 2, is focused on the bar code label by diffractive condenser 4. It is made to scan the label when it is reflected by polygonal mirror 5, which is driven to rotate by a servomotor.

Figure 2:
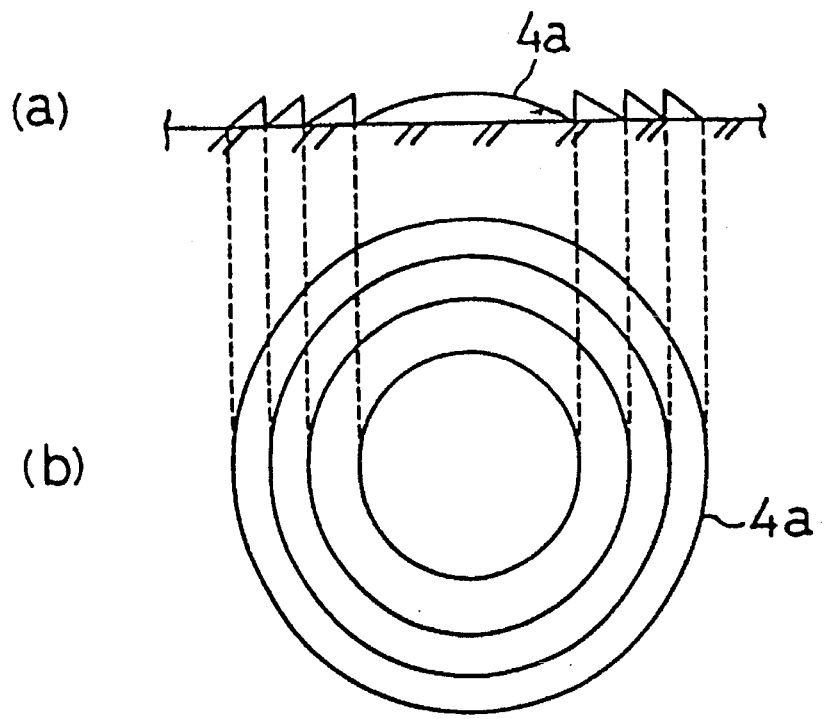
FIGS. 2(a) and 2(b) show cross sectional and frontal views of one example of a diffractive condenser a micro-Fresnel lens)
Figure 3:
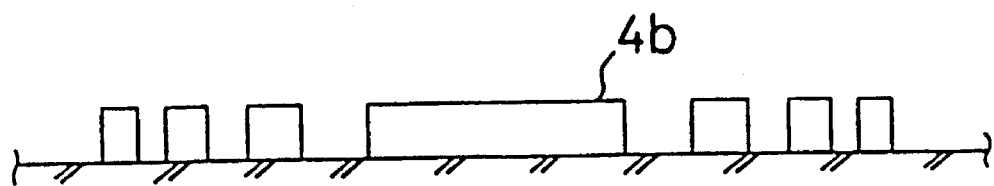
FIG. 3 shows a cross section of another example of a diffractive condenser.
Figure 4A:
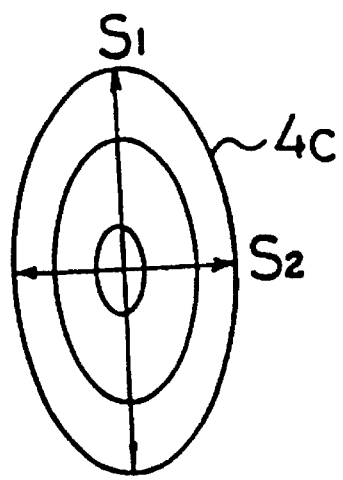
FIGS. 4(a) and 4(b) show frontal views of another example of a diffractive condenser.
Figure 4B:
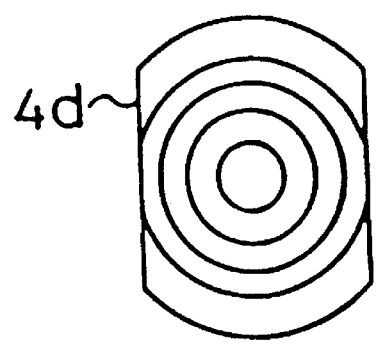

The typical lens used for diffractive condenser 4 is micro-Fresnel lens 4a. This lens has a sawtooth-shaped cross section, and it has the concentric pattern of unequal spaces (different from circular bandwidths) shown in FIGS. 2(a) and 2(b). However, condenser 4 need not be limited to the lens with sawtooth cross section shown in FIG. 2(a). Micro-Fresnel condenser 4b, which has the rectangular cross section shown in FIG. 3, could also be used. A micro-Fresnel lens 4c like that shown in FIG. 4(a), with a pattern of concentric ellipses having a long diameter $S_1$ and a short diameter $S_2$ ($S_1 \neq S_2$) could be used, or one like Micro-Fresnel lens 4d, shown in FIG. 4(b), which is an ellipse with both sides cut off, or one with slits.

Figure 5:
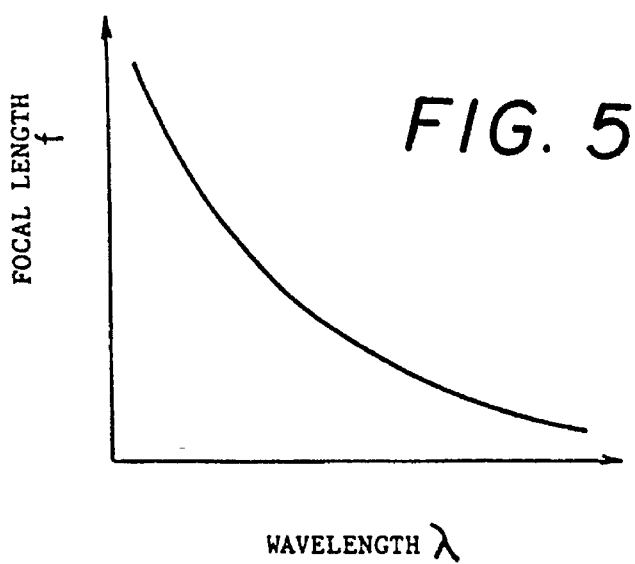
FIG. 5 shows the relationship between the wavelength and the distance between the diffractive condenser and the focal point.

FIG. 5 graphically shows how the focal distance f is related to the incident wavelength $\lambda$. With a refraction lens, the focal distance remains virtually unchanged when the wavelength is varied; but with condenser 4, a Fresnel lens which causes the light to diffract, the focal distance f varies in approximately inverse proportion with the incident wavelength $\lambda$, as shown in FIG. 5.

Thus, when the wavelength of light beam 3, which is emitted by optical semiconductor light source 2, is changed, the focal length f of diffractive condenser 4 will also change. As a result, the location upon which light beam 3 will be focused by diffractive condenser 4 will change. This is further illustrated in FIGS. 6(a), 6(b) and 6(c). These diagrams show what happens when the distance a from light source 2 to diffractive condenser 4 is held constant and the wavelength $\lambda$ of light beam 3 from light source 2 is varied. Let us assume that the wavelengths of light beam 3 shown in FIGS. 6(a), 6(b) and 6(c), which we shall call $\lambda_2$, $\lambda_1$ and $\lambda_3$, have a relationship such that $\lambda_1 > \lambda_2 > \lambda_3$ Then the relationship of the focal distances $f_2$, $f_1$ and $f_3$ of diffractive condenser 4 shown in FIG. 5 will be $$f_1 < f^2 < f^3$$

Let us call the focal distance of condenser 4 distance f; the distance between the light source and the condenser distance "a"; and the distance between the condenser and the position of the object to be detected distance "b". Then the relationship of these distances will be $$1/f = (1/a) + (1/b)$$

Figure 6A:
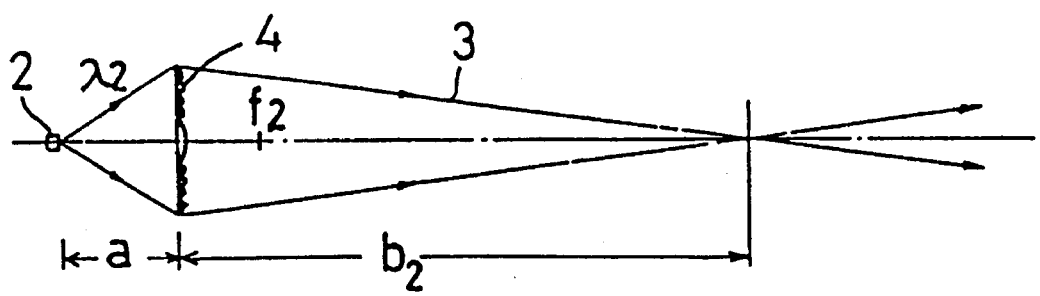
FIGS. 6(a), 6(b) and 6(c) show how the focal position of the light beam changes when the wavelength of the light emitted by the optical semiconductor light source is changed.
Figure 6B:
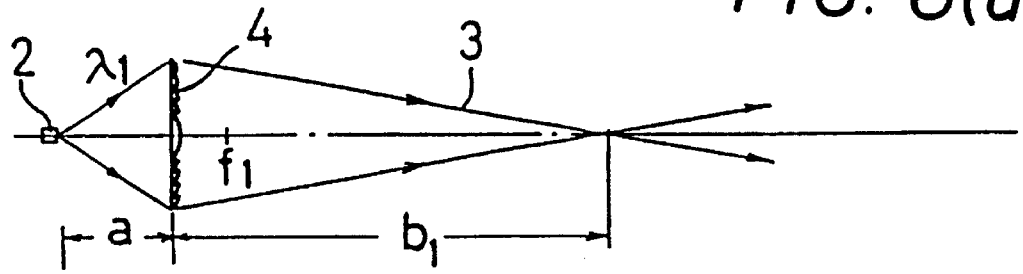
Figure 6C:
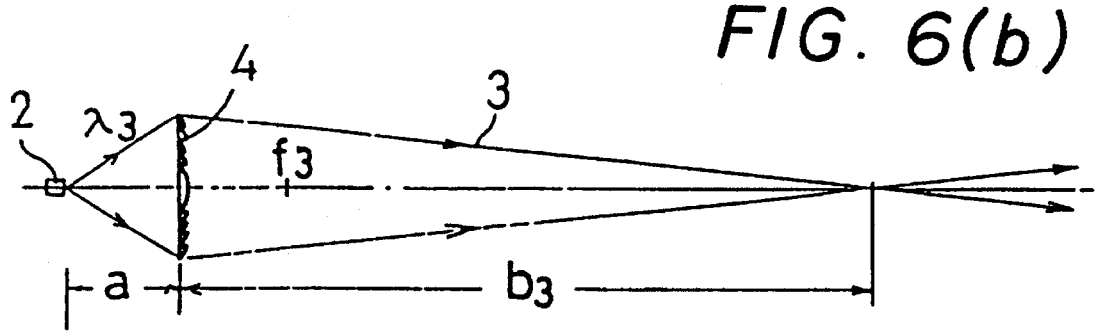

And the relationship among the distances $b_2$, $b_1$ and $b_3$, the distances to the focal position in FIGS. 6(a), 6(b) and 6(c), will be $$b_1 < b_2 < b_3$$

Thus, as the wavelength $\lambda$ of the beam emitted by light source 2 is lengthened, the focal position will be moved closer to optical scanner 1; and as the wavelength $\lambda$ is shortened, the focal position will be moved away from scanner 1. Thus, if the wavelength λ of the beam emitted by light source 2 is made to vary or scan by using a Fresnel lens or other diffractive condenser (4) in the optical system, the focal position of light beam 3 emitted by bar code reader 1 will change, and it can be made to scan along the optical axis.

Figure 7:
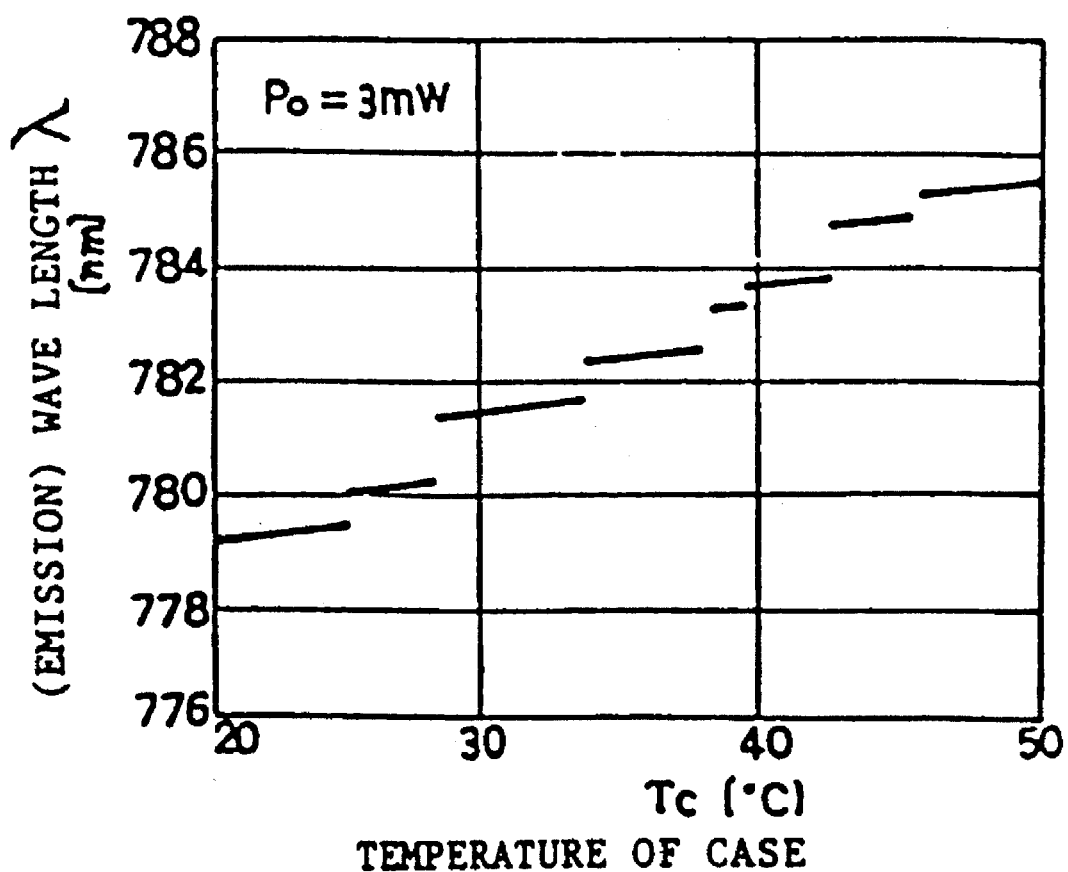
FIG. 7 shows the relationship between the wavelength of the light emitted by a semiconductor laser element and the temperature of the case.
Figure 8:
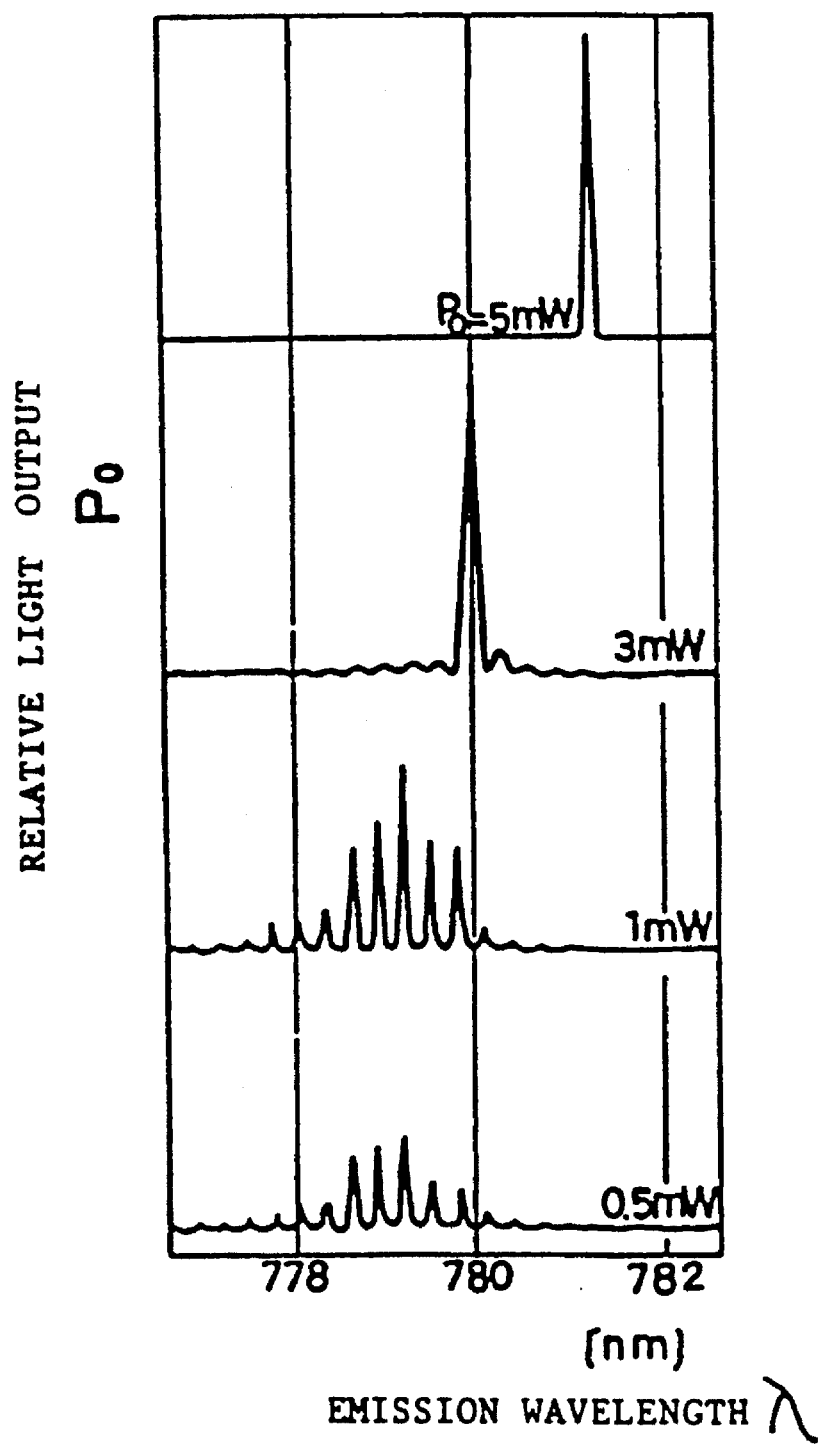
FIG. 8 shows the relationship between the light output of a semiconductor laser element and the resonant wavelength.

The wavelength λ of the light emitted by light source 2, a semiconductor laser element or LED, varies according to the temperature $T_c$ of the case on the light source and the light output $P_o$ of that light source. FIG. 7 shows the relationship between the temperature $T_c$ of the case on the semiconductor laser element and the wavelength λ of the light emitted (the resonant wavelength). As the temperature $T_c$ of the case increases, the wavelength λ of the emitted light becomes longer. FIG. 8 shows the relationship between the wavelength λ of the light emitted by the semiconductor laser element (the resonant wavelength) and the relative light output $P_o$. As the relative light output $P_o$ increases, the wavelength λ of the emitted light shifts toward the long wavelength region. Thus, when the temperature $T_c$ of the case or the light output $P_o$ of light source 2 changes, the wavelength λ of the emitted light will change, and the focal position of refractive condenser 4 will change.

Figure 9:
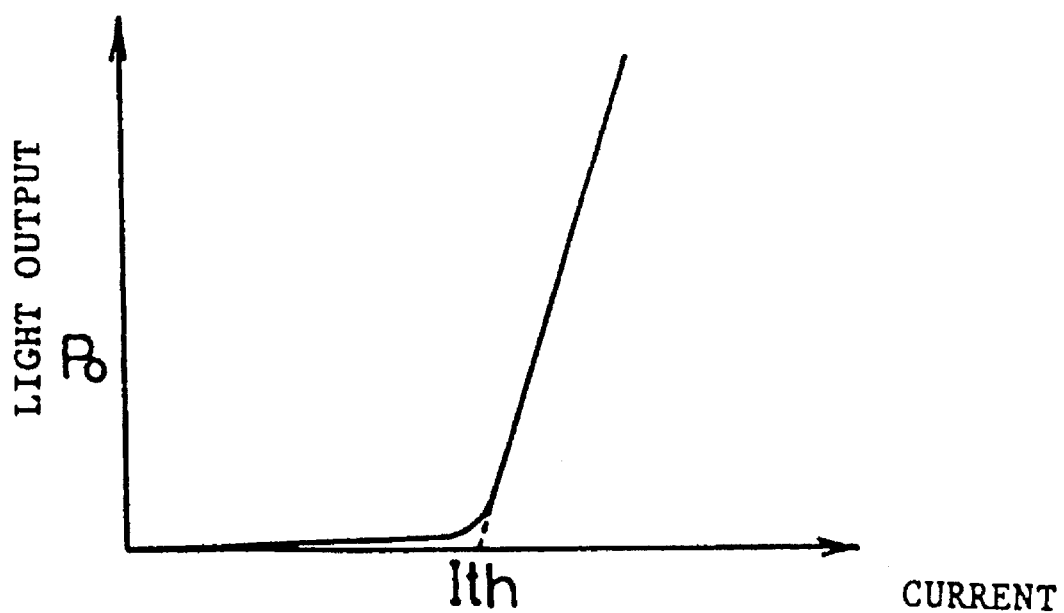
FIG. 9 shows the relationship between the light output of a semiconductor laser element and the forward current.
Figure 10:
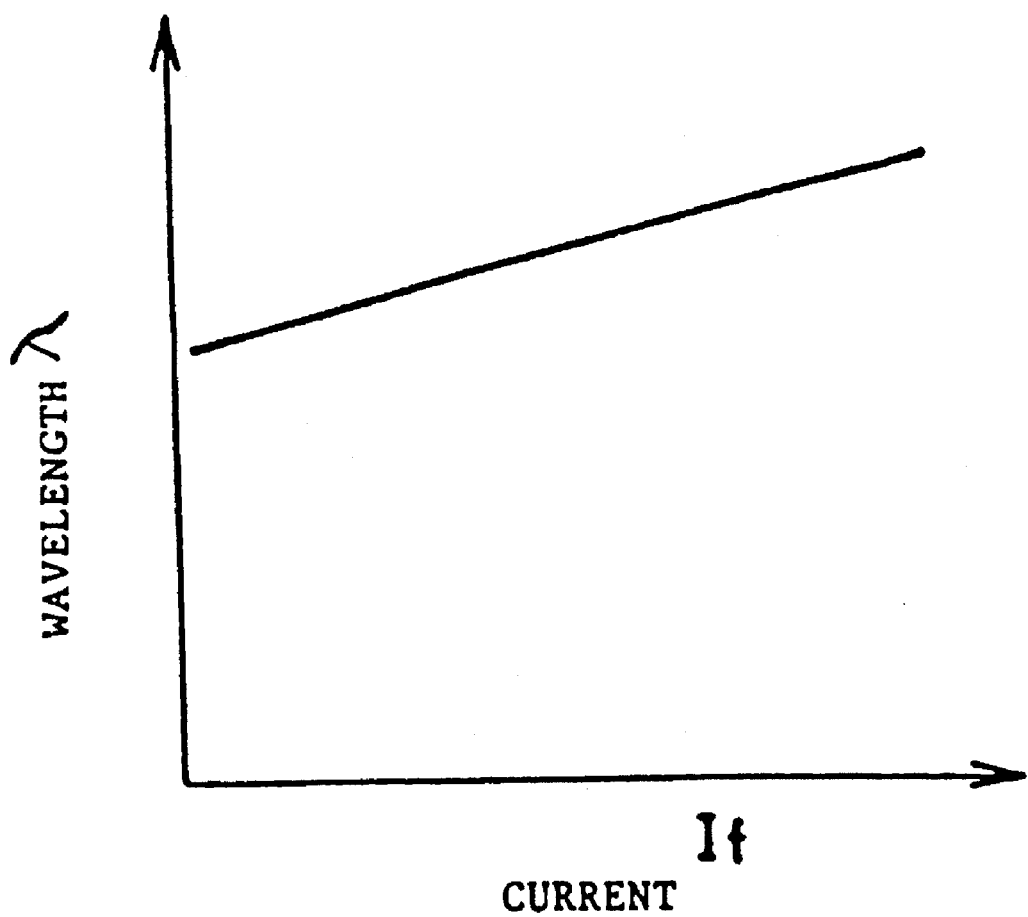
FIG. 10 shows the relationship between the wavelength of the light emitted by a semiconductor laser element and the forward current.

However, it is not practical to change the wavelength λ of the light emitted by light source 2 by controlling the temperature $T_c$ of the case, as the response speed is too slow. As can be understood from the light output of the semiconductor laser and the forward current characteristics shown in FIG. 9, the light output $P_o$ can be controlled by varying the current (the forward current) $I_f$ which drives the optical semiconductor serving as light source 2. As can be seen in FIGS. 8 and 9, the wavelength λ of the emitted light will become longer as the drive current (the forward current) $I_f$ supplied to light source 2 is increased; and the wavelength λ will become shorter as the drive current $I_f$ is decreased. The relationship between the wavelength λ of the light emitted by the optical semiconductor serving as a light source and the drive current (the forward current) $I_f$ is shown in FIG. 10.

Thus, we see that optical scanner 1, in which this invention has been implemented, is designed in such a way that changing the wavelength λ of the emitted light by controlling the drive current $I_f$ for optical semiconductor light source 2 allows us to adjust the focal position of light beam 3.

Figure 11:
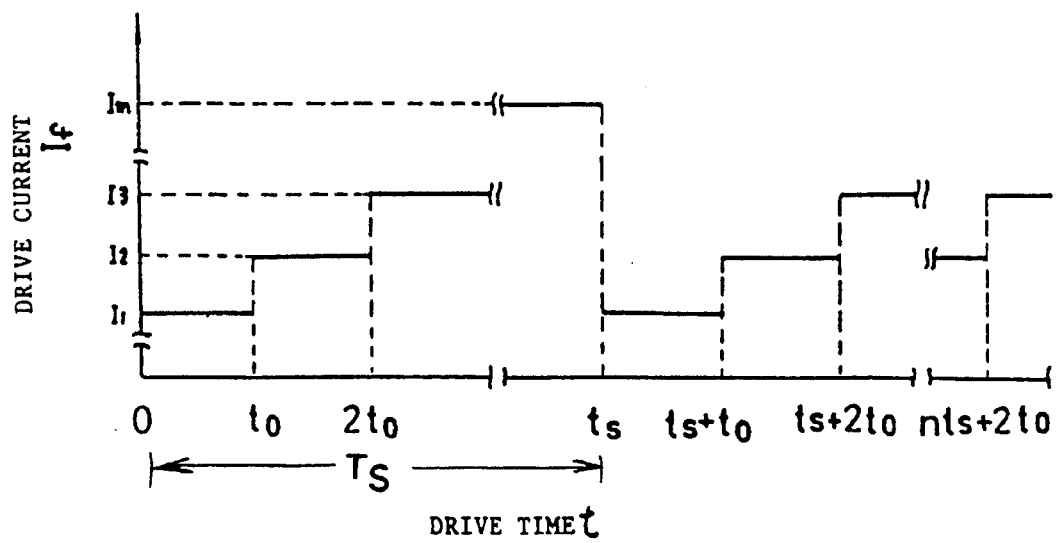
FIG. 11 shows the embodiment by which the drive current is controlled by a circuit to control its modulation.

The drive current $I_f$ which is supplied to light source 2 can be controlled by control and modulation circuit 6, which modulates the drive current. The focal position of light beam 3, which is emitted by optical scanner 1, can be caused to scan in various ways by using control and modulation circuit 6 to vary the control mode of drive current $I_f$. FIG. 11 is a timing chart showing one embodiment by which control and modulation circuit 6 can drive light source 2. In this embodiment, drive current $I_f$ is varied discontinuously at m levels which we shall call $I_1, I_2, \ldots,$ and $I_m$. The period $T_s$, during which drive current $I_f$ varies will be m times the duration $t_o$ of a single step. The modulation control of drive current $I_f$ by control and modulation circuit 6 will be synchronous with the scanning period τ (the time it takes for the light beam to scan the entire bar code label by the deflector). The time to of one step must be sufficiently longer than the scanning period τ. Preferably, the time $t_o$ of one step should be an integral multiple of the scanning period τ.

Figure 12A:
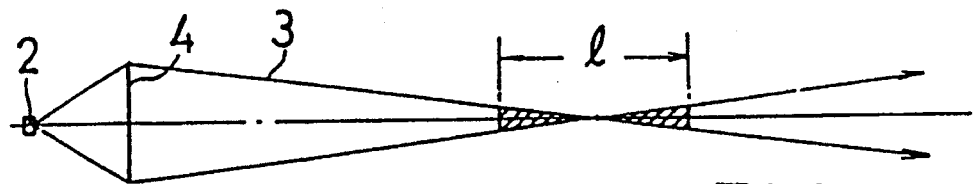
FIG. 12(a) shows the reading range when the focal position is fixed; and 12(b) shows the range when the focal position can be changed.
Figure 12B:
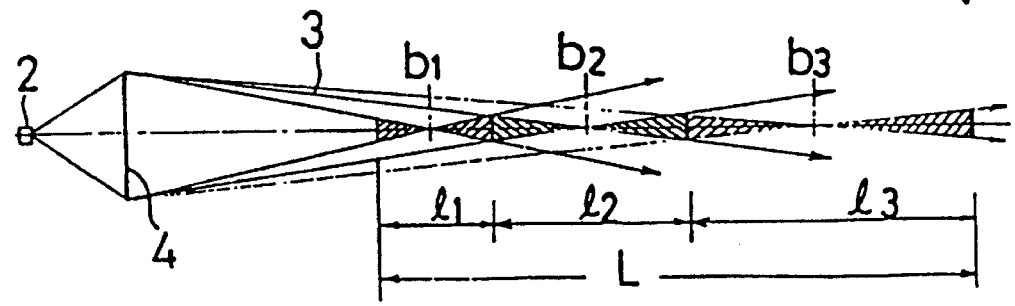

When light source 2 is driven at a fixed drive current $I_f$, without modulation, by control and modulation circuit 6, the region where scanner 1 can read the data at a high rate (the region of high comprehension or high resolution) is region l in FIG. 12(a) (the region filled in with slanted lines in FIG. 12(a)). If drive current $I_f$ is modulated three steps (m=3) by control and modulation circuit 6, the focal position of light beam 3 will move three places as the drive current changes. For example, as illustrated in FIG. 12(b), the focal position moves successively from $b_1$ to $b_2$ and then $b_3$. For each focal position $b_1$, $b_2$ and $b_3$, there is a corresponding region $l_1$, $l_2$ and $l_3$ (all filled in with slanted lines in FIG. 12(b)) where data can be read at a high rate. Because the time $t_o$ required for one step is longer than the period τ during which the beam scans the entire bar code label by the deflector, the bar code can be scanned at least one or more times in focal position $b_1$, then at least once or more times in a second focal position $b_2$, and then at least once or more times in a third focal position $b_3$. During one of these scans, the bar code will possibly enter the region of high comprehension or high resolution, and the code will be read correctly. In other words, the wide region L yields three regions of high comprehension, $l_1$, $l_2$ and $l_3$; and the allowable range for the reading distance of the bar code reader is greatly expanded. By the same token, the regions of medium and low resolution are also expanded.

Figure 13:
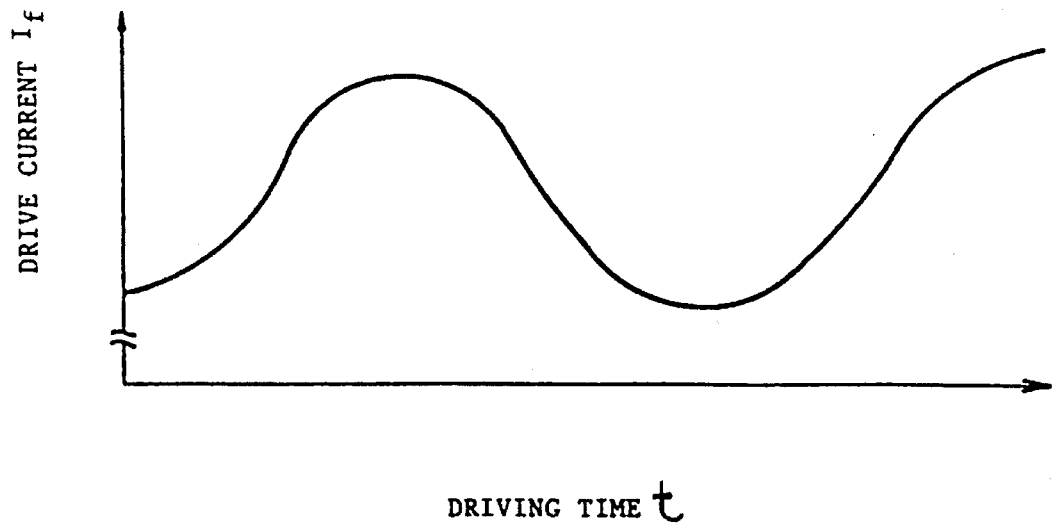
FIG. 13 shows another embodiment by which the drive current is controlled by a circuit to control its modulation.

FIG. 13 is a timing chart for another embodiment to control drive current $I_f$ via control and modulation circuit 6. Drive current $I_f$ is modulated as a sine wave and varied continuously.

Figure 14:
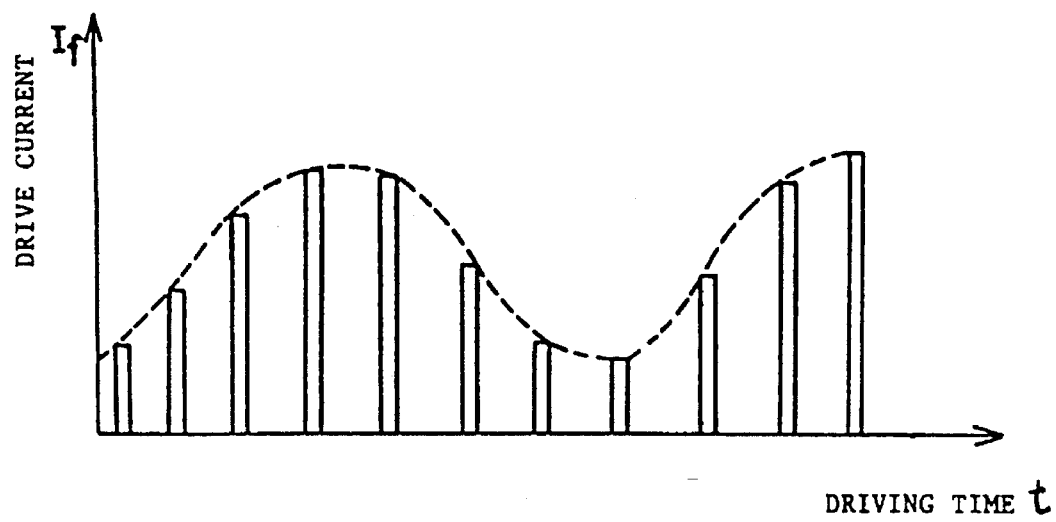
FIG. 14 shows still another embodiment by which the drive current is controlled by a circuit to control its modulation.

FIG. 14 is a timing chart for still another embodiment to control drive current $I_f$ by means of control and modulation circuit 6. When light source 2 is driven by a pulse, it is desirable to generate the pulses along a sine wave. It is also possible to modulate the drive current in some other mode entirely, in which case there would be no need to synchronize with the scanning period.

Figure 15:
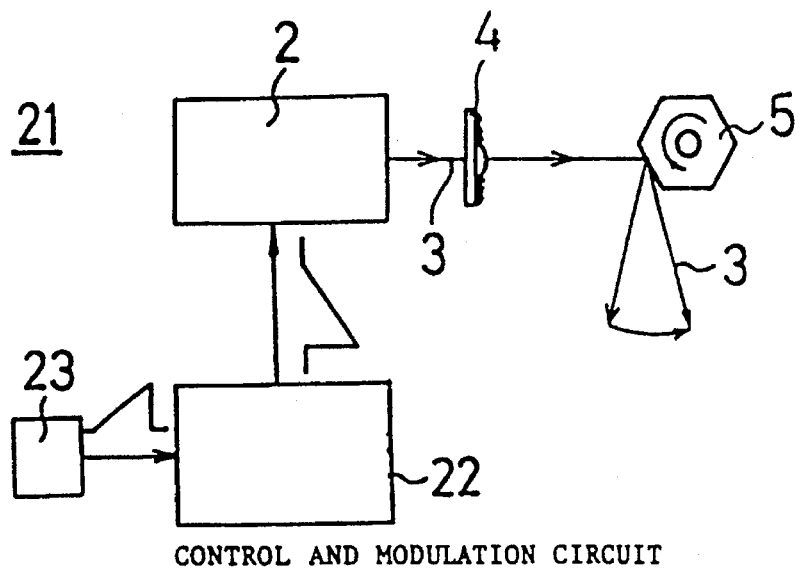
FIG. 15 shows another optical scanner in which this invention can be implemented.

FIG. 15 shows the structure of optical scanner 21, which is another example of how this invention could be implemented. This scanner has a control circuit 22 (the drive circuit for the optical semiconductor) which modulates the current $I_f$ that drives the optical semiconductor serving as light source 2. The amplitude of drive current $I_f$ is changed by means of a control 23, which may be an external control or a variable resistance control. When control 23 is operated manually, the value of drive current $I_f$ changes, and the focal position of optical scanner 21 changes. The focal position can be moved in a continuous or discontinuous fashion by operating control 23 by hand continuously or discontinuously. Control 23 should be moved over a period of time which is as long as or longer than the scanning period τ.

Figure 16:
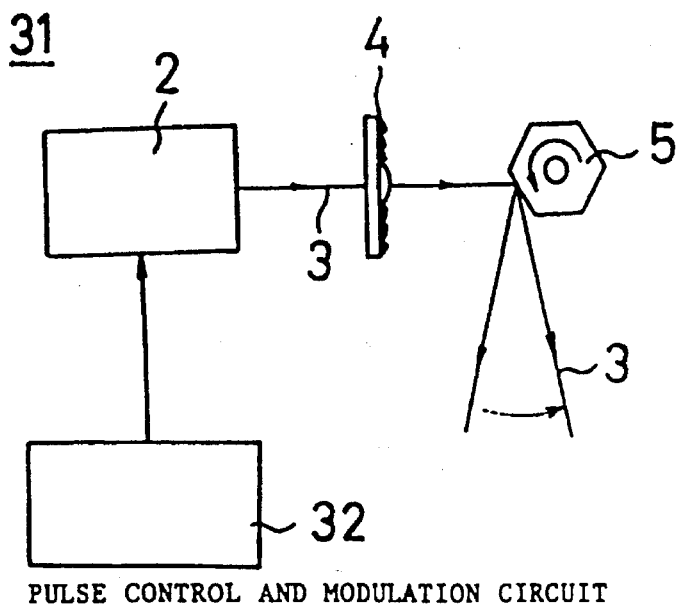
FIG. 16 shows yet another optical scanner in which this invention can be implemented.

FIG. 16 is a structural diagram of optical scanner 31, yet another embodiment in which this invention can be implemented. This scanner has a control circuit 32 (the drive circuit for the optical semiconductor) which provides drive pulses to optical semiconductor light source 2. This circuit 32 adjusts the period $T_p$ of the pulse and the pulsewidth W. A circuit suitable for the function of circuit 32 to control the drive current pulses can be constructed quite simply by using a V-f (voltage-frequency) converter circuit.

The usual method used to change the wavelength λ of the light emitted by optical semiconductor light source 2, a semiconductor laser element or the like, is to vary the strength of drive current $I_f$, as described above, However, the wavelength λ of the emitted light can also be changed in a similar fashion by using a repeating on-off pulse current as drive current $I_f$ and varying the period of the pulse $T_p$ and the pulsewidth W. When the period and pulsewidth are varied, the duty factor (the ratio $W/T_p$) of drive current $I_f$ changes, and the intensity $P_o$ of the light emitted by light source 2 changes. As a result, the wavelength λ of the emitted light changes. Thus, by adjusting the period of the pulse $T_p$ and the pulsewidth W of drive current $I_f$, we can change the focal position of optical scanner 31. If we repeatedly vary the period and the pulsewidth of drive current $I_f$, we can cause the focal position of optical scanner 31 to scan along the optical axis.

Figure 17A:
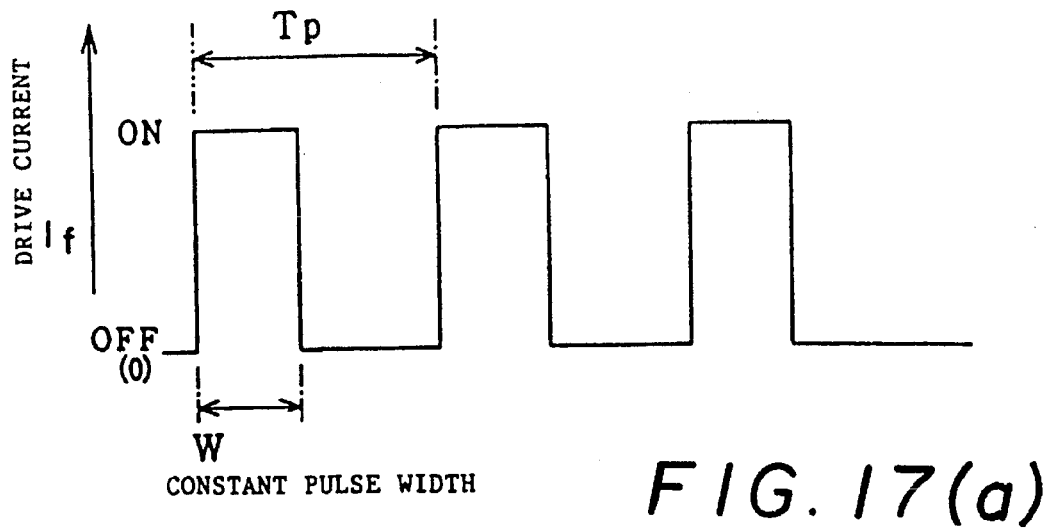
FIG. 17(a) illustrates a waveform of the pulse drive current.
Figure 17B:
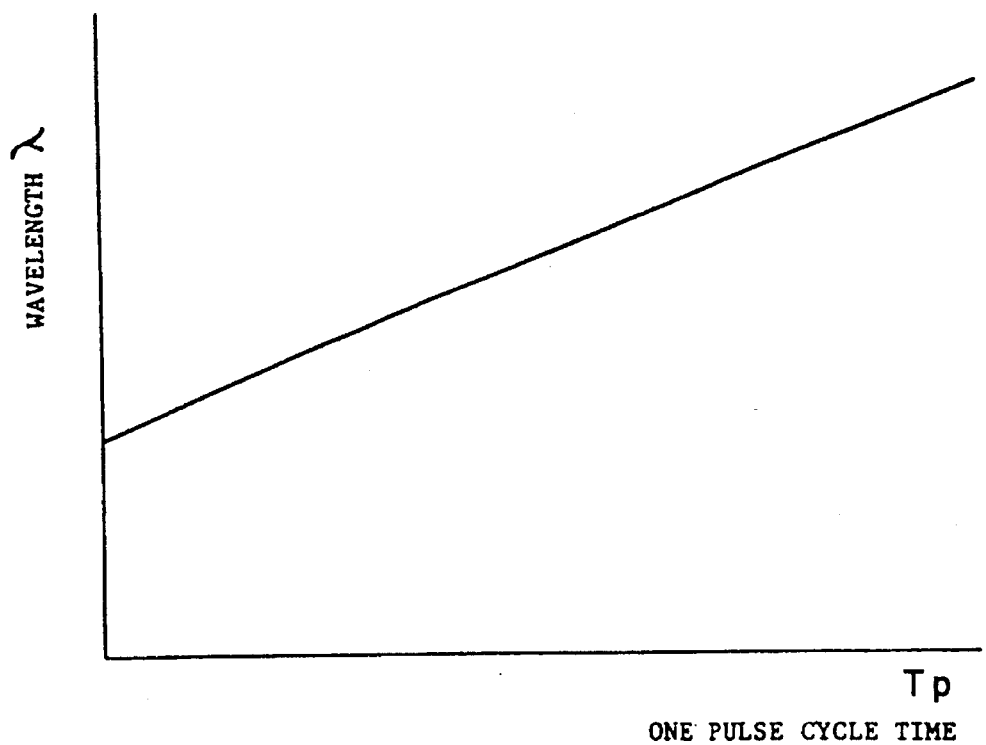
FIG. 17(b) shows the relationship between the pulse cycle of the pulse drive current and the wavelength of the light emitted by the optical semiconductor.

FIGS. 17(a) and (b) show one embodiment to drive optical semiconductor light source 2 by means of control circuit 32, which controls the drive current pulse. FIG. 17(a) shows the waveform of drive current $I_f$. If the pulsewidth W is kept constant, as shown in FIG. 17(a), while the period of the pulse $T_p$ is varied, the wavelength λ of the emitted light will get longer as the period $T_p$ increases, as shown in FIG. 17(b).

Figure 18A:
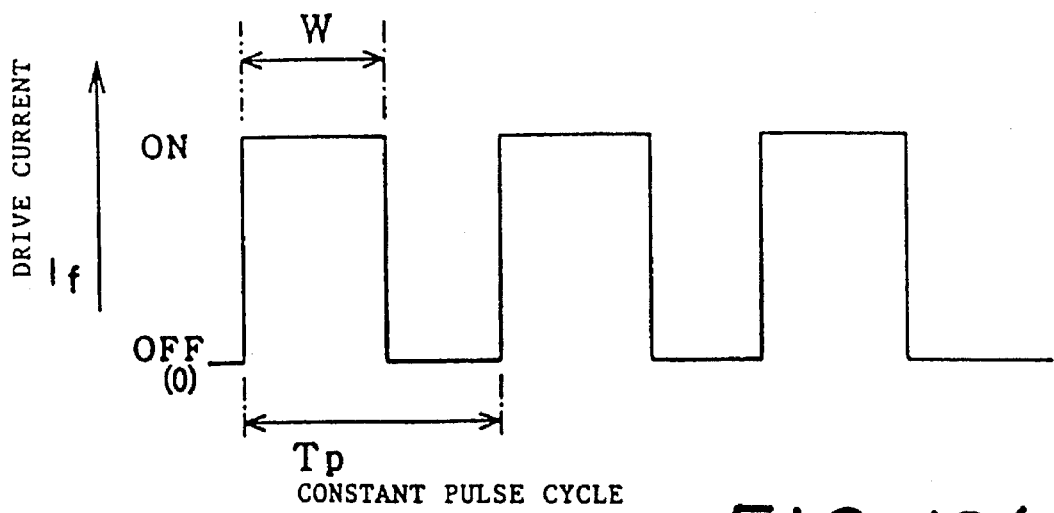
FIG. 18(a) shows a waveform of the pulse drive current.
Figure 18B:
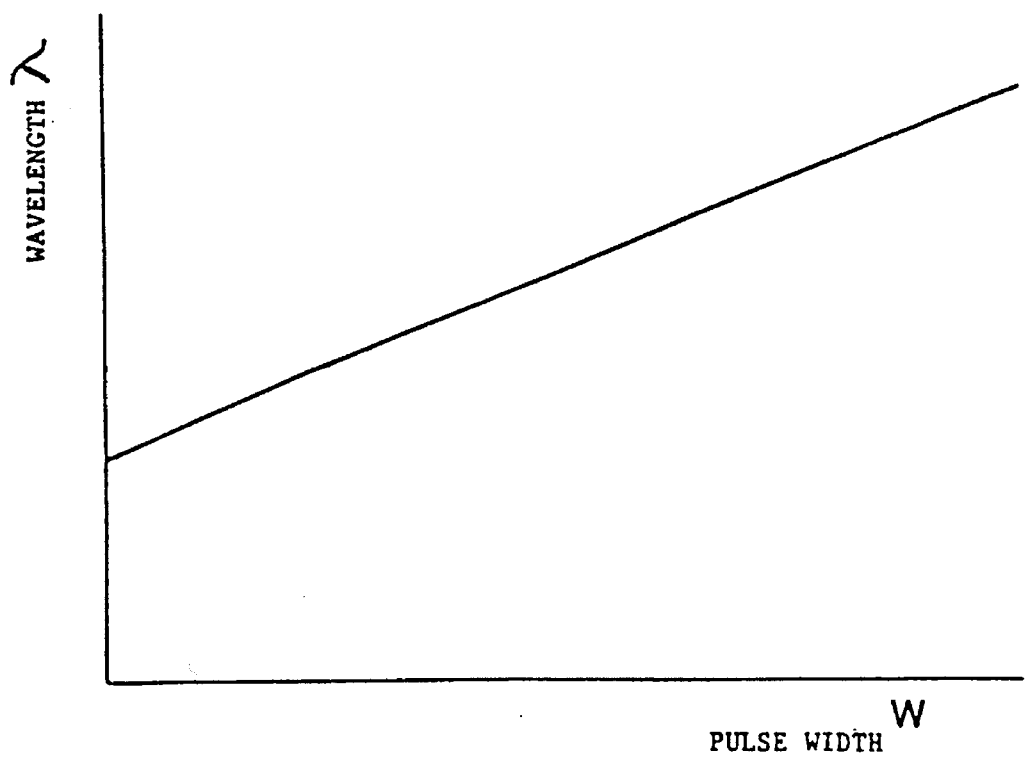
FIG. 18(b) shows the relationship between the pulsewidth of the pulse drive current and the wavelength of the light emitted by the optical semiconductor.

FIGS. 18(a) and (b) show another embodiment to drive light source 2 by means of control circuit 32. FIG. 18(a) shows the waveform of drive current $I_f$. If the period of the pulse $T_p$ is kept constant, as shown in the graph, while the pulsewidth W (or the duty factor) is varied, the wavelength λ of the emitted light will get longer as the pulsewidth W increases, as shown in FIG. 18(b).

Figure 19A:
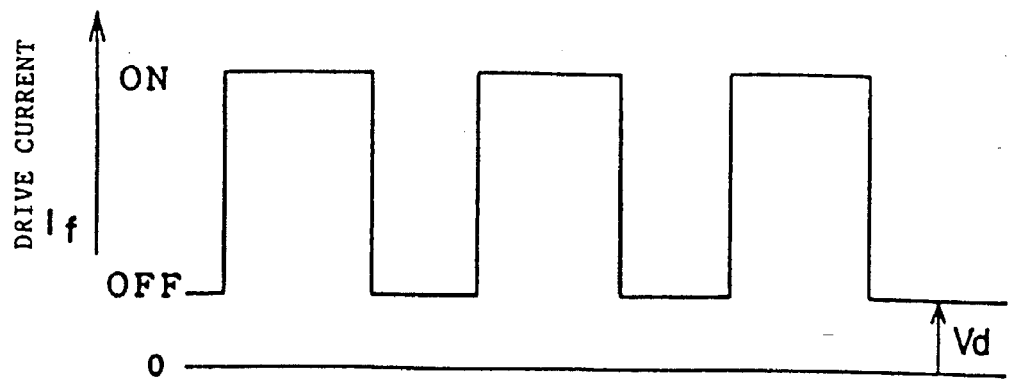
FIG. 19(a) shows a waveform of the pulse drive current.
Figure 19B:
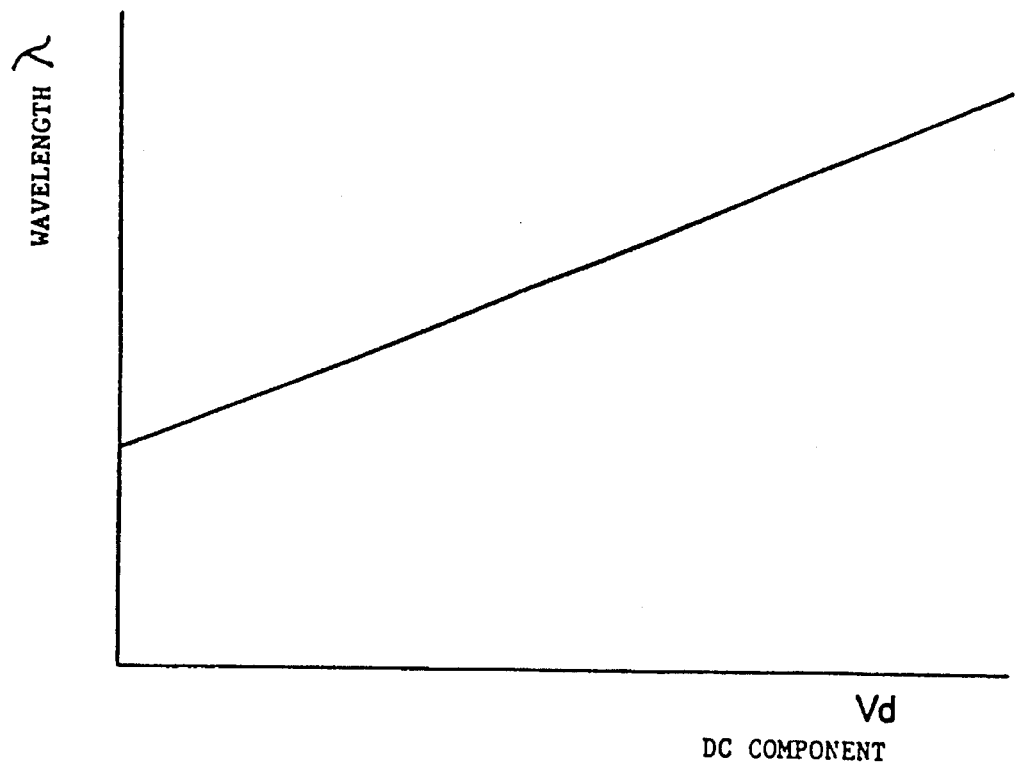
FIG. 19(b) shows the relationship between the size of the DC component of the pulse drive current and the wavelength of the light emitted by the optical semiconductor.

FIGS. 19(a) and (b) show still another embodiment to drive light source 2 by means of control circuit 32. FIG. 19(a) shows the waveform of drive current $I_f$. DC bias component $V_d$ is added when the pulse drive is in the off state. When this embodiment is used by control circuit 32 to drive light source 2, the period of the pulse $T_p$ and the pulsewidth W are not used to vary the wavelength λ of the emitted light. Instead, the wavelength λ is made to vary by changing the size of the DC component $V_d$. As can be seen in FIG. 19(b), the larger the DC component $V_d$, the longer the wavelength λ.

Figure 20:
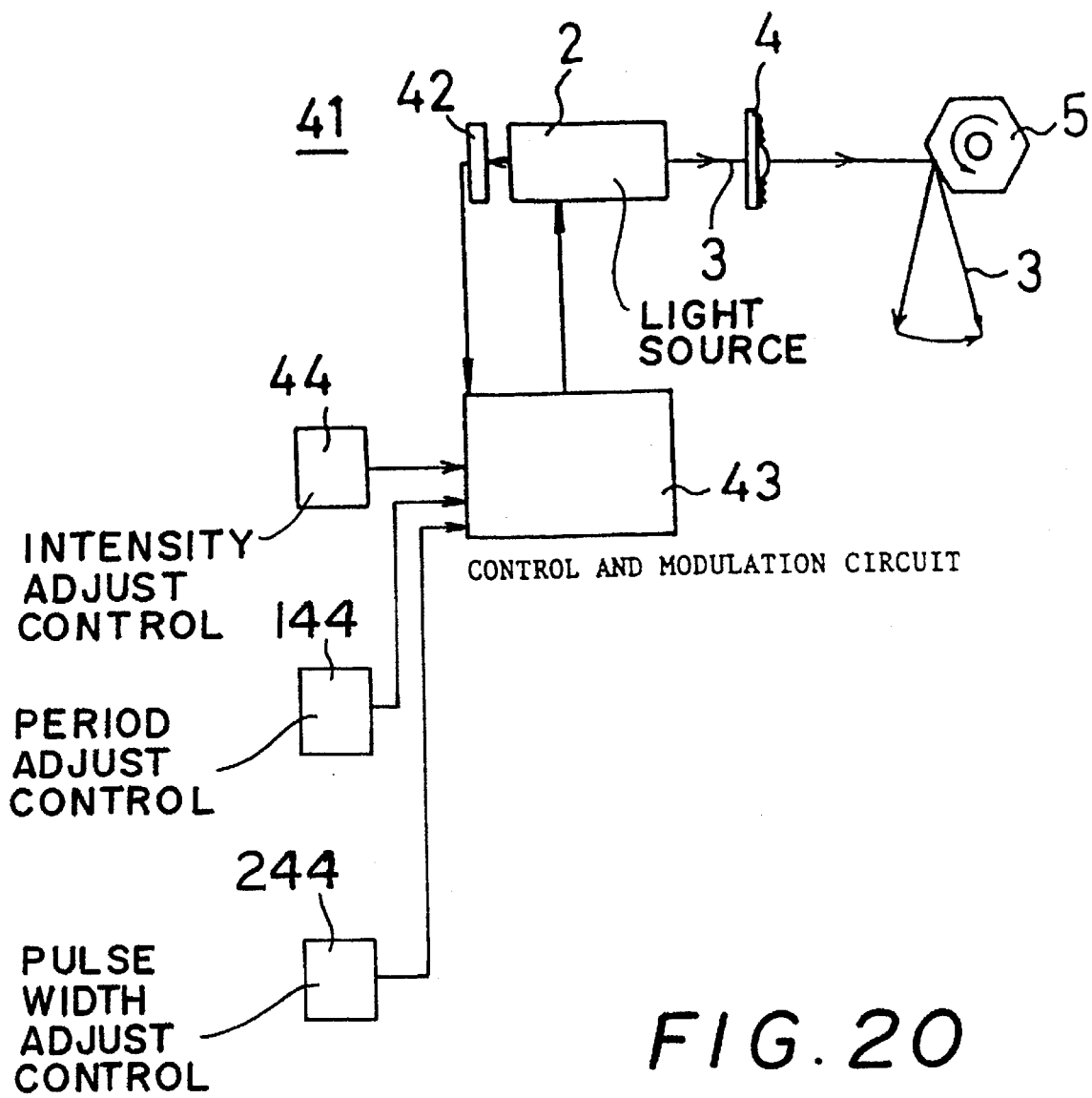
FIG. 20 is a structural diagram of another optical scanner in which this invention can be implemented.

FIG. 20 is a structural diagram of optical scanner 41, which is yet another embodiment in which this invention could be implemented. In the front part of optical scanner 41 is diffractive condenser 4, such as a micro-Fresnel lens or the like. The light beam 3, which is focused by diffractive condenser 4, is reflected by polygonal mirror 5 and so made to scan. Behind light source 2 is light receiving element 42. This element receives the light 3a emitted by light source 2 toward the rear; it serves to monitor the intensity $P_o$ of the emitted light. Light receiving element 42 may be realized either as a part of or separate from light source 2, and it may be located inside optical scanner 41 or outside of it. By controlling the current $I_f$ which drives light source 2, control circuit 43 (the drive circuit for the optical semiconductor) can vary the intensity $P_o$ of light beam 3, the beam emitted by that light source. The photodetection signal from photodetector unit 42 is output to control circuit 43, which uses it as feedback to control drive current $I_f$ according to the level of the signal it receives. In this way the intensity $P_o$ of the light emitted by light source 2 can be controlled so that it remains constant. The intensity $P_o$ can be adjusted, by way of control circuit 43, by control 44, an external or variable resistance switch.

The wavelength λ of the light emitted by light source 2, a semiconductor laser element or the like, is influenced not only by the value of the drive current, as discussed earlier, but also by the temperature $T_c$ of the case. If the ambient temperature undergoes a profound change, it is conceivable that even though the value of the drive current is constant, the wavelength λ of the light emitted by the optical semiconductor will change, as will the focal position of light beam 3, the beam emitted by optical scanner 41. To minimize fluctuation of the focal position due to the influence of ambient temperature, it is important to drive light source 2 so as to maintain the intensity $P_o$ of its emitted light at a constant value. In this example, the intensity $P_o$ of the emitted light is monitored by photodetector unit 42 and is fed back to control circuit 43, so that it can be maintained at a constant level. The control circuit corrects intensity $P_o$ to a specified value. The value at which intensity $P_o$ will be held constant can be adjusted by control 44.

While the intensity $P_o$ of the light emitted by optical semiconductor light source 2 is being monitored by photodetector unit 42, it can be varied or scanned by control circuit 43 either continuously or discontinuously within a fixed range. In this case it is desirable that the light intensity $P_o$ be varied in periods which are as long as or longer than the scanning period τ of the deflector. The light intensity $P_o$ can also be varied or scanned either continuously or discontinuously by manual operation of switch controls 144 or 244 to vary the period or pulse width as previously discussed herein. Here, too, the cycle of variation should be as long as, or longer than, the scanning period τ of the deflector.

Figure 21:
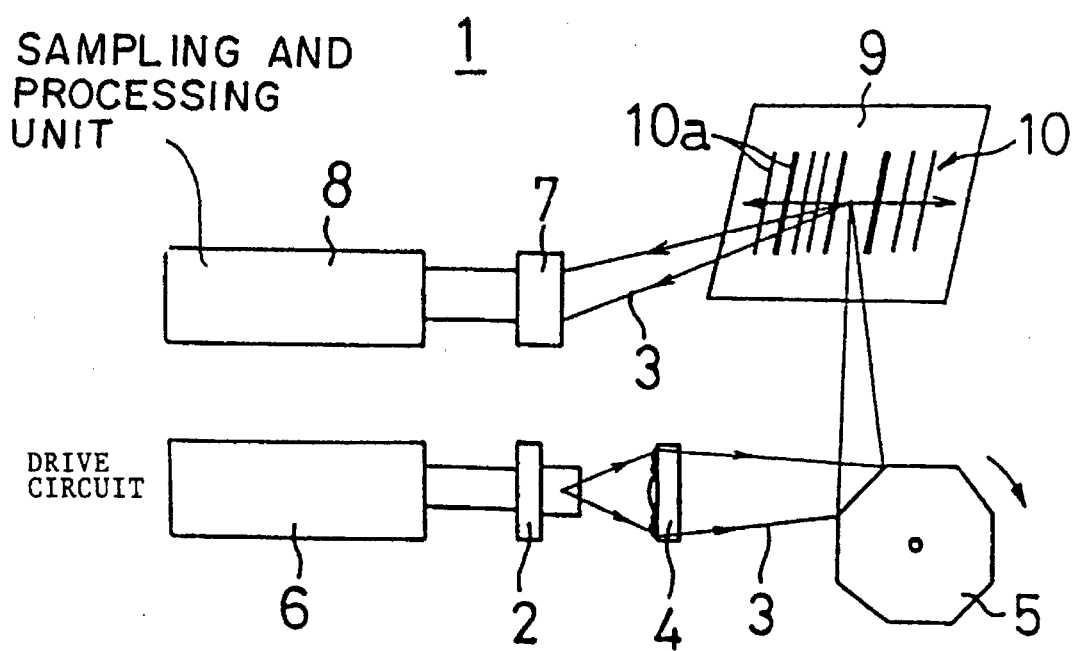
FIG. 21 is a simple diagram of the structure of a bar code reader in which this invention can be implemented.

FIG. 21 is a simple diagram of the structure of bar code reader 1, in which this invention could be implemented. The optical scanner portion of this bar code reader is composed of optical semiconductor light source 2, which may be a semiconductor laser element or an LED; diffraction-type condenser (diffraction lattice) 4, a micro-Fresnel lens which focuses light beam 3 emitted by light source 2 on the detection position; polygonal mirror (deflector) 5, which deflects light beam 3 after it is focused and causes it to scan; and control and modulation circuit 6 for the optical semiconductor, which controls the drive current $I_f$ for light source 2, as described above. The detector portion is composed of photodetector unit 7, a photodiode or phototransistor which receives light beam 3 once it is reflected from bar code label 9, the object to be detected; and processing unit 8, which processes the photodetection signals from photodetector unit 7.

Light beam 3, which is emitted by light source 2, is focused on bar code label 9 by refraction condenser 4. It is made to scan label 9 by polygonal mirror 5, which is driven to rotate by a servomotor. When light beam 3 is reflected by label 9, it is received by photodetector unit 7. Processing unit 8 distinguishes bar code 10 from the white spaces by means of the photodetection signal from receiving element 7, thus decoding bar code 10.

Thus, bar code reader 1, in which aforesaid optical scanner can be implemented, is designed in such a way that changing the wavelength λ of the emitted light by controlling the drive current $I_f$ beyond threshold current $I_{th}$ for optical semiconductor light source 2, as described in FIG. 7 and 8, allows control of the focal position of light beam 3.

Figure 23:
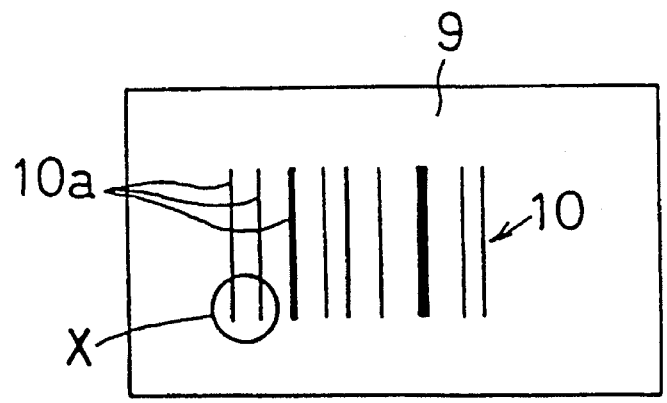
FIG. 23 is a front view of a bar code label.

The drive current $I_f$, which is supplied to light source 2, can be controlled by control and modulation circuit 6, which drives the optical semiconductor. The focal position of light beam 3, which is emitted by light source 2, can be caused to scan in various ways by varying the control mode of drive current $I_f$ from control and modulation circuit 6, as described above. FIG. 22 is a timing chart showing one embodiment for driving light source 2 from control and modulation circuit 6. In this embodiment, a triangular wave pulse is used as one of various control modes of drive current $I_f$. FIG. 22(a) shows a portion of bar code 10 (the portion marked "X") on bar code label 9, shown in FIG. 23. As shown in FIG. 22(b), control and modulation circuit 6 drives optical semiconductor light source 2 with drive current $I_f$, which is a triangular wave pulse with a period equal to the shortest detection time T, the time needed to detect the narrowest bar 10a, as shown in FIG. 22(b), or the time needed to detect the narrowest segment when the bars are divided into equal segments (in FIG. 22 (b) they are divided into three segments). Photodetection signal processing unit 8 divides the photodetector signals from photodetector unit 7 into segments shorter than the shortest detection time T, as shown in FIGS. 22(c) and (d) and processes those signals (T/2).

Figure 24A:
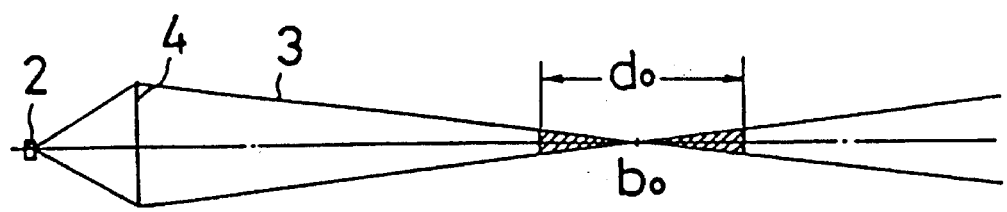
FIG. 24(a) shows the reading range when the focal position is fixed.
Figure 24B:
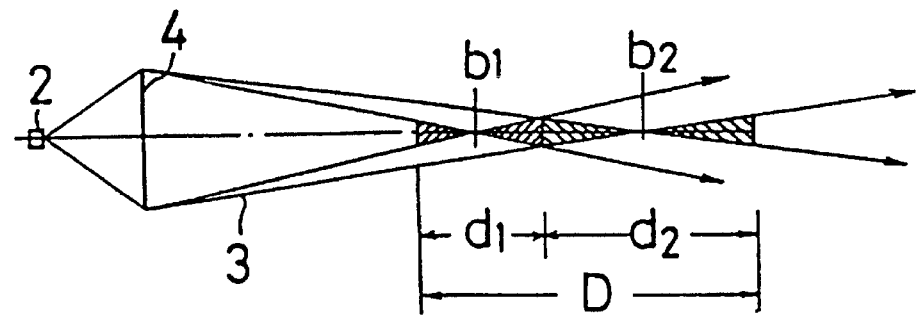
FIG. 24(b) shows the range when the focal position can be changed.

When light source 2 is driven at a fixed drive current $I_f$, without modulation, by control and modulation circuit 6, the region where bar code reader 1 can read the data at a high rate (the region of high resolution) is region $d_o$ in FIG. 24(a), which includes focal point $b_o$ (the region filled in with slanted lines in FIG. 24(a)). In this example, as shown in FIG. 25, the wavelength of the light emitted by light source 2 changes from $\lambda_1$ to $\lambda_2$ when the drive current $I_f$, which has the form of a single period of a triangular wave pulse, goes from $I_{th}$ to $I_m$. However, if we consider dividing this single period of the triangular wave drive current $I_f$ into, for example, regions a and b, the region of the wavelength emitted by light source 2 will also be divided in two. The difference in wavelength between regions a and b will cause the focal distance of diffractive condenser 4 to change, and the focal point of light beam 3 will move successively from $b_2$ to $b_1$, as pictured in FIG. 24(b). When the focal point moves from $b_2$ to $b_1$, the region where the comprehension rate is high moves from $d_2$ to $d_1$ (both are marked with slanted lines in FIG. 24(b)). Thus, the region of high comprehension D has now been expanded to include both $d_1$ and $d_2$. The current $I_f$, which drives light source 2, changes continuously in the form of a triangular wave pulse. Thus, while light beam 3 is being scanned by polygonal mirror 5 over the narrowest bar to be detected, the focal point of the light beam is scanned continuously in the direction of the optical axis. During this process it possibly enters the region where bar code 10 can be red at a high rate, and the code is read correctly. In this way, the region where bar code reader 1 can read codes with high comprehension or resolution is expanded. By the same token, the regions of medium and low resolution are also expanded.

The photodetector signal from photodetector unit 7 changes continuously with the movement of the focal point of light beam 3. However, photodetection signal processing unit 8 samples and processes the photodetector signal at periods of T/n (where n is an integer greater than 1), which are shorter than the shortest detection time T. As a result, processing unit 8 obtains photodetector signals like those shown in FIGS. 22(c) and (d). FIG. 22(c) shows what the signal looks like when the object to be detected (bar code label 9) is far away from bar code reader 1. Because light beam 3 is absorbed by bar code lines 10a, the signal has virtually a fixed strength; but for the white spaces, drive current $I_f$ is smaller, and the focal distance f of condenser 4 is long, so the strength of the signal increases. FIG. 22(d) shows the appearance of the signal when the object, again bar code label 9, is close to the reader. For the white spaces, drive current $I_f$ is large, and the focal distance f of condenser 4 is short, so the signal becomes stronger. As a result, n signals are obtained over the distance corresponding to the narrowest detectable width of bar code 10. If only the strongest signals in each of the narrowest detectable widths are used as detection signals, signals can be obtained which have a high S/N ratio regardless of the distance of bar code label 9.

It is possible to expand the region of high comprehension or high resolution of the previously mentioned embodiment, which involves the drive for the optical semiconductor. The previously mentioned embodiment uses a polygonal mirror to cause the light beam to scan one or more times along the bar code in a given focal position, then causes the light beam to scan one or more times along the bar code in a different focal position, then to cause the light beam to scan one or more times along the bar code in a third focal position. However, if we call the scanning time needed for the polygonal mirror to scan the light beam once $T_s$, then if we use three different focal points, the detection time required by this embodiment will be $3T_s$. If we perform the scan twice in each focal position to improve the reliability of detection, the detection time will increase to $6T_s$. With this embodiment, each time we increase the number of focal points or the number of scanning repetitions, the detection time required becomes longer and longer.

With this invention, polygonal mirror 5 causes light beam 3 to scan the distance corresponding to the narrowest width of bar code 10 in a certain time period. During that time, the focal position of the light beam is made to scan once along the optical axis. Because the focal position of light beam 3 is changed electrically by control and modulation circuit 6, it can move faster than the speed at which mirror 5 causes the light beam to scan. If photodetector signal processing unit 8 samples the signal three times during this process, the focal position for reading can be set at three points. In this way the focal position can be changed while light beam 3 is being scanned by mirror 5 without interrupting the scan within each of the narrowest detection widths. The detection time is not increased, but remains $T_s$. If we wish to scan twice in the same position to improve the reliability of detection, we can scan the focal position of light beam 3 twice along the optical axis while mirror 5 is causing the beam to scan the narrowest width of bar code 10. In this case, too, the detection time does not increase, but is still $T_s$. Thus, this embodiment allows us to increase the number of focal positions and the number of scanning repetitions without increasing the detection time and provides an efficient way to read bar code 10.

In the example given above, processing unit 8 divides the signal within the shortest detection time T, samples it at least twice and processes it. However, nothing prevents the signal from photodetector unit 7 from being processed continuously.

In the example given above, control and modulation circuit 6 drives optical semiconductor light source 2 by the triangular wave pulse current shown in FIG. 22(b). However, it would also be possible to scan the focal point of light beam 3 in the direction of the optical axis in just the same way by driving light source 2 with any of the various currents $I_f$ shown in FIGS. 26(a) through (e). If light source 2 is driven by the triangular wave pulse current $I_f$ in FIG. 26(e), the focal point of light beam 3 will move along the optical axis from a position close to the lens to one further away. If it is driven by the pulse current $I_f$ shown in FIG. 26(b), the focal point of light beam 3 will make one complete trip out and back along the optical axis, The patterns of drive current $I_f$ shown in FIGS. 26(a), (c) and (d) add a bias current $I_B$ to the triangular wave pulse currents $I_f$ pictured in FIGS. 22(b), 26(b) and 26(e). An embodiment which drives light source 2 by adding a bias current $I_B$ in this way allows us to set the value of bias current $I_B$ by means of a switch (not pictured). By changing this setting, we can change the wavelength region of the emitted light, and thereby change the region scanned by the focal point of light beam 3. If bias current $I_B$ is made larger, the wavelength $\lambda$ of the emitted light will become longer, as shown in FIG. 25, and the focal point of light beam 3 will move closer to bar code reader 1. By changing the setting of bias current $I_B$, we can also vary the rate of change of drive current $I_f$, which will change the amount of variation in the wavelength of the emitted light. By switching the bias current on and off to add bias current $I_B$ to drive current $I_f$ and remove it, or by repeatedly increasing and decreasing bias current $I_B$, we can offset the region where bar code 10 can be read. Bias current $I_B$ can be varied either continuously or discontinuously by a switch.

FIGS. 27(a) and (b), respectively, show another embodiment in which this invention has been implemented to control drive current $I_f$ and the effective light output from optical semiconductor light source 2. In this example, as shown in FIG. 27(a), the drive current $I_f$, a triangular wave pulse with a period equal to the shortest detection time T, is switched on and off by a short pulse signal with a period of T/m (where m is an integer). The duty ratio of the short pulse signal is varied. The top portion of each pulse signal is a triangular wave pulse. When the amplitude of the short pulse signal is high, the duty ratio will be small; when the signal amplitude is low, the duty ratio will be large. For this reason the effective light output $P_e$ of light beam 3 emitted by optical semiconductor light source 2 can be fixed, as shown in FIG. 27(b). It would be desirable to provide a photodetector unit (not pictured) behind light source 2 as a monitor to detect the light emitted in that direction. The duty ratio of the short pulse signal should also be controlled to insure that the light output detected by the photodetector unit which acts as a monitor does not vary. Photodetector signal processing unit 8 adjusts its timing in response to changes in the duty ratio of the short pulse drive current $I_f$ for optical semiconductor light source 2, receives the signal from photodetector unit 7, and processes it.

In this example, a short pulse of light is output by light source 2, and the effective light output $p_e$ of each pulse of light is fixed. This simplifies the signal processing performed by processing unit 8.

FIGS. 28(a) and (b) show, respectively, yet another embodiment to control drive current $I_f$ in a different embodiment of this invention, and the quantity of light W received by photodetector unit 7 when processing unit 8 samples the signal. In this embodiment, control and modulation circuit 6 drives optical semiconductor light source 2 by means of drive current $I_f$, a triangular wave pulse with a period corresponding to the detection time T for the smallest segment, as shown in FIG. 28(a). Processing unit 8 samples the photodetector signal from photodetector unit 7 with the same timing as the short pulse signal, as shown in FIG. 27(a). That is to say, processing unit 8 switches on and off repeatedly at periods of T/m (where m is an integer), detecting the signal from photodetector unit 7 as a pulse. The duty factor at each sampling time is controlled as shown in FIG. 28(b) to insure that the quantity of light from light beam 3 which is reflected by the white spaces on bar code label 9 will remain constant at every focal point.

In the examples shown in FIGS. 27 and 28, the bias current added to drive current $I_f$ can be changed either continuously or discontinuously.

Figure 29:
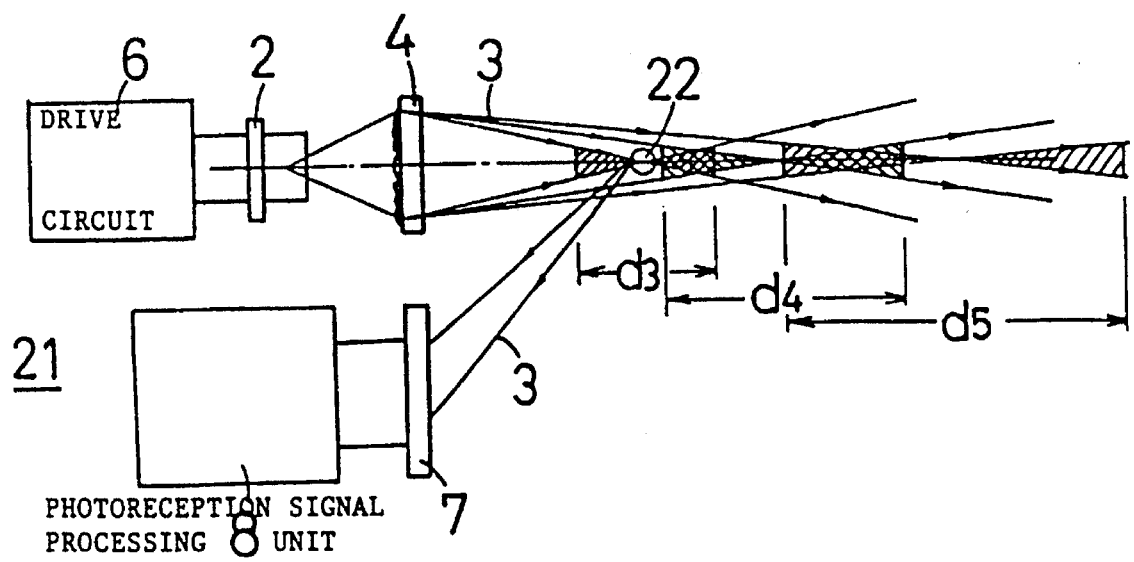
FIG. 29 illustrates the structure of a photoelectric sensor which provides yet another example of how this invention might be implemented.
Figure 30A:
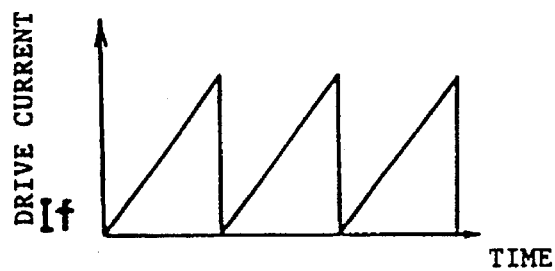
FIG. 30(a) shows how the drive current is varied in the photoelectric sensor.
Figure 30B:
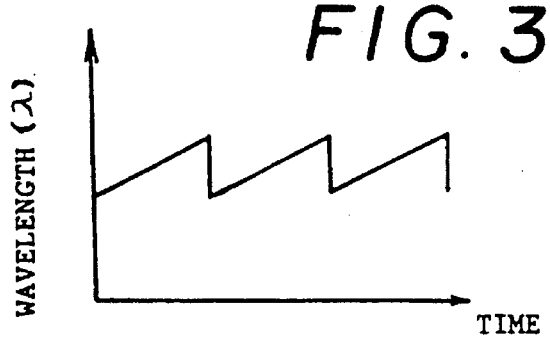
FIG. 30(b) shows how the wavelength of the light beam emitted by the optical semiconductor light source varies over time.

FIG. 29 is a schematic drawing of photoelectric sensor 21, another embodiment in which this invention can be implemented. Photoelectric sensor 21 consists of light source 2, a semiconductor laser element or LED; diffractive condenser (diffraction lattice) 4, a micro-Fresnel lens to focus light beam 3, the beam emitted by light source 2, on the position where something is to be detected; and control and modulation circuit 6, which controls the current that drives light source 2. Light beam 3 is aimed at object 22, the object to be detected. Sensor 21 also has a photodetector unit 7, which is a photodiode or phototransistor to receive light beam 3 once it is reflected by object 22; and processing unit 8, which processes the signal from photodetector unit 7. When there is a microscopic object 22 on the optical axis of light source 2, the light beam 3 reflected by object 22 will strike photodetector unit 7, and object 22 will be detected. In this case, the object to be detected is microscopic, so the range of detection is necessarily close to the focal point of light beam 3. However, when drive current $I_f$ is periodically varied by drive unit 8, as shown in FIG. 30(a), the wavelength of light beam 3 emitted by light source 2 will vary as in FIG. 30(b). In this way, the detection range of photoelectric sensor 21 can be expanded to $d_3$, $d_4$ or $d_5$ as shown in FIG. 29. Thus, the detection range is much wider than that of previous photoelectric sensors.

In this type of photoelectric sensor 21, it is desirable to add bias current $I_B$ to drive current $I_f$, as illustrated in FIG. 31(a). The addition of bias current $I_B$ will shift the wavelength of light beam 3, which is emitted by light source 2, to the long wavelength region, as shown in FIG. 31(b). This will shift the detection range closer to photoelectric sensor 21. We could, for example, shift the detection range FIG. 32 from $d_6$ to $d_7$. By adjusting bias current $I_B$, we can adjust the amount of shift we achieve. Switching bias current $I_B$ on and off will shift the center of the detection range by two steps.

Figure 37:
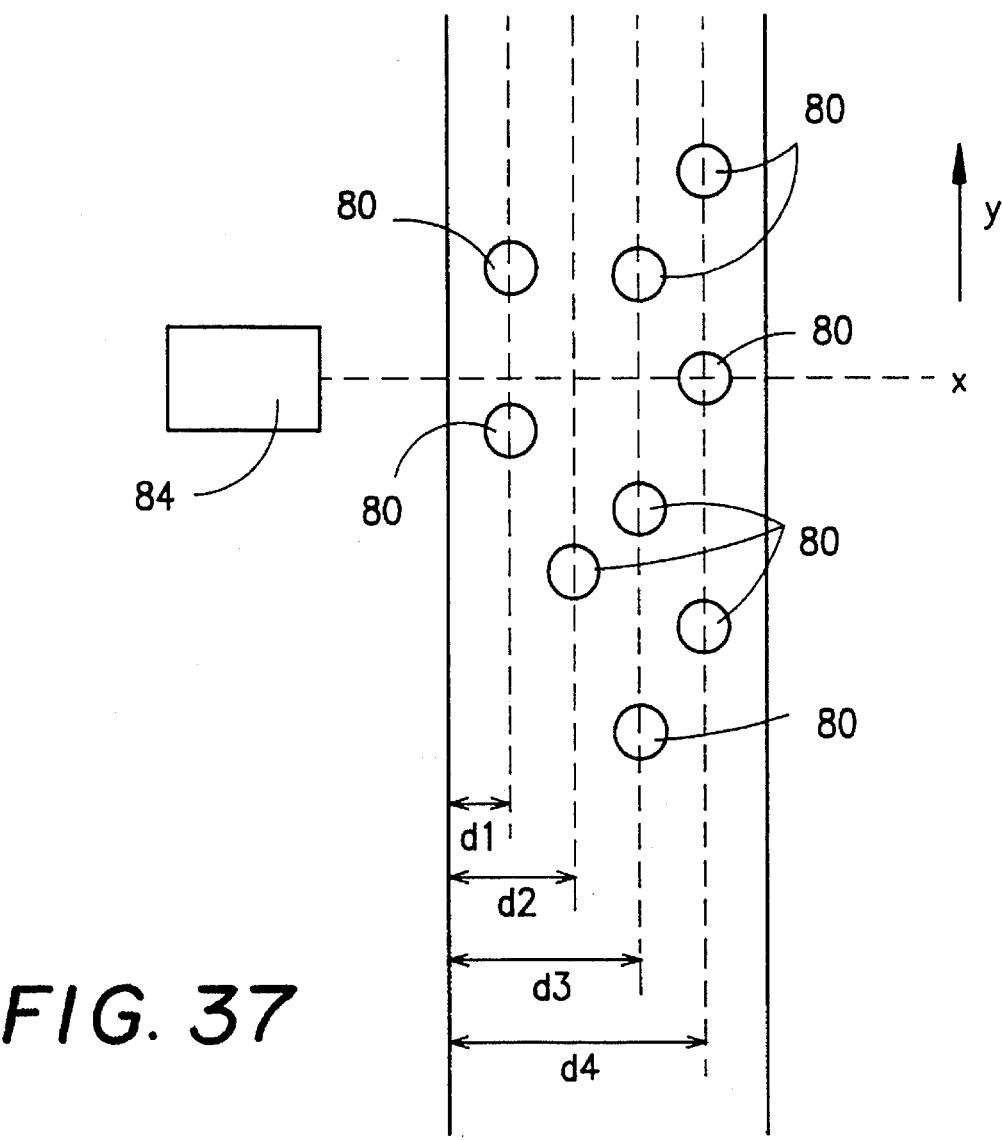
FIG. 37 shows a photoelectric sensor application of the invention on a conveyor belt.

FIG. 37 illustrates an application of the invention to sensors used to detect objects passing on a conveyor apparatus. Objects 80 traveling in direction Y along conveyor apparatus 82 pass the optical axis x of the sensor 84 at different distances, $d_1 \ldots d_4$, from the photosensor 84. The same approaches to varying the focal length discussed above can be used to improve detection of the objects. Where the objects 80 are placed on the conveyor in lanes at fixed distances from photosensor 84, the light source can be driven to step the focal length through a predetermined sequence, such that the focal length is periodically set to each fixed distance, $d_1 \ldots d_4$, depending on the number and size of the objects in each lane. Where the objects are randomly placed on the conveyor, the focal length can be varied continuously at a rate to assure detection of each object. As a further enhancement, it is also possible at each focal length to scan a bar code on the object.

The examples above describe a sensor which uses reflected light. One could, of course, apply the same principle in a photoelectric sensor using the light which passes through an object.

This invention makes it possible to adjust the focal distance or focal position of a condenser by varying the wavelength of the light emitted by an optical semiconductor which serves as the light source. It thus enables us to freely adjust and control the focal position of an optical device.

Because the focal position is changed electrically and optically, it can be changed faster than in embodiments which involve moving the light source mechanically. The structure of this type of device is also simpler than that of mechanical-type sensors.

When this optical device is equipped with a deflector and used in a bar code reader, it allows the region where the bar code can be read at a high rate to be expanded, and it allows the bar code to be read accurately without requiring the product on which the bar code label is affixed to be moved about.

When it is used in a photoelectric sensor, this device allows the detection range to be extended along the optical axis.

If the device is equipped with a photodetector unit to monitor the intensity of the light emitted by the optical semiconductor, it will be able to correct fluctuations of the focal position of the light beam due to variations in ambient temperature and so on. This will allow the focal position to be stabilized, and it will optimize the accuracy with which the focal position can be controlled.

Because the focal position is made to scan by the drive unit, the object can be read or detected even when the focal position has changed as a result of environmental vagaries such as temperature or humidity. The resistance of this device to environmental agents is excellent.

To change the focal position, the current which drives the optical semiconductor light source is varied in periods which correspond to the detection time for the smallest segment. Thus, even when detection is being performed while the position of detection is being moved, the range of detection can be extended without increasing the detection time. The reading or detection time will not increase when the detection process is repeated to prevent errors in reading or detection.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. An optical sensor device to sense an object comprising:
   an optical semiconductor light source driven by input current;
   a diffractive condenser lens to diffract light emitted by said optical semiconductor light source, said lens comprising an unevenly spaced diffraction lattice, said lens directing light toward said object at a different focal length for each wavelength of said light emitted by said optical semiconductor light source;
   a photodetector unit to receive said light from said object;
   a processing unit to process signals from said photodetector unit;
   a drive circuit to vary said input current driving said optical semiconductor light source to thereby vary said wavelength emitted by said optical semiconductor light source.

2. The optical sensor device recited in claim 1, wherein each cross section of said lens is in the form of sawteeth.

3. The optical sensor device recited in claim 1, wherein said input current is a pulsed current of varying amplitude.

4. The optical sensor device recited in claim 3, wherein a duty factor of said input current can vary to change the light output of said optical semiconductor light source.

5. The optical sensor device recited in claim 3, wherein a bias level of said input current can vary to change the light output of said optical semiconductor light source.

6. An optical sensor device recited in claim 1, wherein said input current is cyclic.

7. The optical sensor device recited in claim 6 comprising a manual control to vary the cycle of said input.

8. The optical sensor device recited in claim 6, wherein said input current varies continuously.

9. The optical sensor device recited in claim 6, wherein said input current varies discontinuously.

10. The optical sensor device recited in claim 1, wherein said input current varies continuously.

11. The optical sensor device recited in claim 1, wherein said input current varies discontinuously.

12. The optical sensor device recited in claim 1, wherein said processing unit processes said light by sampling an output from said photodetector unit and generating corresponding pulse signals.

13. An optical sensor device recited in claim 1, further comprising a feedback circuit to feed back a part of said light emitted by said optical semiconductor to said drive circuit.

14. An optical scanning sensor device comprising:
    an optical semiconductor light source having an output wavelength dependent upon a drive current;
    a diffractive condenser lens to diffract light emitted by said optical semiconductor light source, said lens comprising an unevenly spaced diffraction lattice, said lens directing light toward said object;
    a photodetector unit to receive said light from said object;
    a processing unit to process signals from said photodetector unit;
    a drive circuit to vary said drive current; and
    a scanning unit to scan said light diffracted by said refractive condenser lens.

15. The optical scanning sensor device recited in claim 14, wherein said object to be read comprises a bar code.

16. The optical scanning sensor device recited in claim 14, wherein each cross section of said lens has a form of sawteeth.

17. The optical scanning sensor device recited in claim 14, wherein said drive circuit varies said drive current for a period longer than one scanning time.

18. The optical scanning sensor device recited in claim 17 wherein said drive current is cyclic, said cycle being variable.

19. The optical scanning sensor device recited in claim 18 wherein said variable cycle can be set by a manual control.

20. The optical scanning sensor device recited in claim 14, wherein said drive current is a pulsed current of varying amplitude.

21. The optical scanning sensor device recited in claim 20, wherein a duty factor of said drive current can vary to change the light output of said optical semiconductor light source.

22. The optical scanning sensor device recited in claim 20, wherein a bias level of said drive current can vary to change the light output of said optical semiconductor light source.

23. The optical sensor device recited in claim 20, wherein a duty factor of said drive current can vary to change the light output of said optical semiconductor light source for a period shorter than a scanning time for a smallest segment of said object.

24. The optical scanning sensor device recited in claim 20, wherein a bias level of said drive current can vary to change the light output of said optical semiconductor light source for a period shorter than a scanning time for a smallest segment of said object.

25. The optical scanning sensor device recited in claim 14, wherein said drive circuit varies said drive current for a period shorter than a scanning time for a smallest segment of said object.

26. The optical scanning sensor device recited in claim 25 wherein said processing unit processes said light by sampling an output from said photodetector unit and generating corresponding pulse signals.

27. The optical scanning sensor device recited in claim 14, further comprising a feedback circuit to feed back a part of said light emitted by said optical semiconductor to said drive circuit.

28. An optical sensor device comprising:

a light source having an adjustable output responsive to a control circuit, said control circuit adjusting the wavelength of light energy emitted by said light source;

a lens receiving said light energy emitted by said light source, said lens having an output directing received light energy toward an object to be sensed and having a significantly different focal length received thereby providing a different resolution of detection at each said wavelength received by said lens; and a detector for receiving light energy from said object to be sensed.

29. The apparatus recited in claim 28 wherein said control circuit comprises means for driving said light source to produce a plurality of wavelengths during a sensing time period for sensing a said object, said plurality of wavelengths resulting in a plurality of focal lengths during said sensing time.

30. The apparatus recited in claim 29 wherein said means for driving comprises a variable current source to adjust said output of said light source.

31. The apparatus recited in claim 29 wherein said means for driving produces a plurality of wavelengths resulting in a plurality of focal lengths within a reading distance from said object to said apparatus, each said focal length providing a different resolution of said detector.

32. The apparatus recited in claim 29 further comprising a scanning unit, said scanning unit scanning light energy from said lens over at least a portion of said object to be sensed.

33. The apparatus recited in claim 32, wherein said portion of said object to be sensed comprises a plurality of segments and wherein said means for driving produces a plurality of wavelengths, resulting in a plurality of focal lengths, for a said sensing time period of a smallest said segment.

34. The apparatus recited in claim 32, wherein said portion of said object comprises a bar code and wherein lines and spaces of said bar code comprise said segments.

35. The apparatus recited in claim 28, further comprising an element receiving light from said light source, said element producing a signal indicative of said output from said light source, said signal being fed back to said control circuit and being used by said control circuit to adjust said light source output to a predetermined level.

36. A method of optically sensing an object, said method comprising the steps of:

directing a wavelength adjustable light source to a lens, said lens having significantly different focal length for each wavelength emitted from said light source;

directing light from said lens toward an object;

adjusting the wavelength emitted to change the focal length; and detecting light.

37. The method recited in claim 36, further comprising scanning light energy from said lens over at least a portion of said object to be sensed.

38. The method recited in claim 37, comprising scanning a plurality of segments of said object and adjusting the wavelength from said light source to produce a plurality of focal lengths for a sensing time period for a smallest of said segments.

39. The method recited in claim 36, wherein said step of adjusting the wavelength varies the focal lengths of light emitted from said lens.

40. The method recited in claim 39, wherein the step of detecting light from said object to be sensed comprises detecting light when said light from said lens has a focal length in a range over which said focal length varies.

* * * * *